(12) United States Patent
Bertin et al.

(10) Patent No.: US 6,400,681 B1
(45) Date of Patent: *Jun. 4, 2002

(54) METHOD AND SYSTEM FOR MINIMIZING THE CONNECTION SET UP TIME IN HIGH SPEED PACKET SWITCHING NETWORKS

(75) Inventors: Olivier Bertin; Gerard Brun, both of Nice; Claude Galand, Cagnes sur Mer; Olivier Maurel, Le Cannet; Laurent Nicolas, Villeneuve Loubet, all of (FR)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,679

(22) Filed: Apr. 1, 1997

(30) Foreign Application Priority Data

Jun. 20, 1996 (EP) .............................. 96480086

(51) Int. Cl.[7] .............................................. H04L 12/56
(52) U.S. Cl. ..................... 370/218; 370/238; 370/352; 370/392; 370/395.32; 370/255; 709/241; 709/242
(58) Field of Search ................................ 370/254, 392, 370/396, 397, 351, 255, 400, 401, 410, 238, 256, 395, 407, 408, 394, 235, 229, 237, 352, 252, 395.2, 218, 395.32; 709/238, 239, 241, 242

(56) References Cited

U.S. PATENT DOCUMENTS 4,794,594 A   12/1988   Picard
4,922,486 A    5/1990   Lidinsky et al. ............ 370/401
5,018,137 A    5/1991   Backes et al. .............. 370/427

(List continued on next page.)

IBM Technical Disclosure Bulletin, V37, #10, Oct. 1994, "Addressing Source Routing in an ATM Emulated LAN", pp. 75–80.

IBM Technical Disclosure Bulletin, V39, #8, Aug. 1996, "Method for Improving Network Availability with Redundant Network Servers", pp. 195–196.

D. Delaney and M. Seaman, Single or Multiple Filtering Databases, May 8, 1997.

S. Horowitz, Dual–Layer Spanning Tree, (A Spanning Tree Proposal for IEEE 802.1Q), May 14, 1997.

(List continued on next page.)

*Primary Examiner*—Seema S Rao
(74) *Attorney, Agent, or Firm*—Cesari and McKenna, LLP; A. Sidney Johnston

(57) ABSTRACT

The present invention is directed to a high speed packet switching network and, in particular to a method and system for minimizing the time to establish a connection between an origin and a destination node. A path calculated at the time the connection is requested is recorded in a Routing Database and updated each time a modification occurs in the network. Furthermore, alternate paths for supporting non-disruptive path switch on failure or preemption, and new paths towards potential destination nodes can be calculated and stored when the connection set up process is idle. These last operations are executed in background with a low processing priority and in absence of connection request.

23 Claims, 13 Drawing Sheets

POTENTIAL PATH COMPUTATION PROCEDURE

U.S. PATENT DOCUMENTS

| | | | |
|---|---|---|---|
| 5,115,433 A | | 5/1992 | Baran et al. ................. 370/400 |
| 5,138,615 A | | 8/1992 | Lamport et al. ............ 370/400 |
| 5,150,360 A | | 9/1992 | Perlman et al. ............. 370/256 |
| 5,233,604 A | * | 8/1993 | Ahmadi et al. ............. 370/238 |
| 5,265,092 A | * | 11/1993 | Soloway et al. ............ 370/238 |
| 5,280,480 A | | 1/1994 | Pitt et al. ..................... 370/402 |
| 5,329,527 A | | 7/1994 | Ujihashi et al. ............ 370/397 |
| 5,357,508 A | | 10/1994 | Le Boudec et al. ......... 370/397 |
| 5,394,402 A | | 2/1995 | Ross .......................... 370/401 |
| 5,420,862 A | | 5/1995 | Perlman ..................... 370/402 |
| 5,444,702 A | | 8/1995 | Burnett et al. .............. 370/312 |
| 5,490,139 A | | 2/1996 | Baker et al. ................. 370/254 |
| 5,491,690 A | | 2/1996 | Alfonsi et al. .............. 370/401 |
| 5,495,426 A | | 2/1996 | Waclawsky et al. |
| 5,526,358 A | * | 6/1996 | Gregerson et al. .......... 370/401 |
| 5,537,468 A | * | 7/1996 | Hartmann ................... 379/221 |
| 5,548,579 A | | 8/1996 | Lebrun et al. |
| 5,561,790 A | | 10/1996 | Fusaro |
| 5,570,359 A | | 10/1996 | Nguyen ...................... 370/404 |
| 5,577,033 A | | 11/1996 | Chang et al. ............... 370/402 |
| 5,581,552 A | | 12/1996 | Civanlar et al. ............ 370/396 |
| 5,590,118 A | | 12/1996 | Nederlof ..................... 370/218 |
| 5,600,638 A | * | 2/1997 | Bertin et al. ................. 370/351 |
| 5,600,644 A | | 2/1997 | Chang et al. ............... 370/404 |
| 5,606,669 A | | 2/1997 | Bertin et al. ................. 709/223 |
| 5,612,957 A | * | 3/1997 | Gregerson et al. .......... 370/401 |
| 5,636,216 A | | 6/1997 | Fox et al. .................... 370/402 |
| 5,636,217 A | | 6/1997 | Moelard ...................... 370/338 |
| 5,649,108 A | * | 7/1997 | Spiegel .................. 395/200.12 |
| 5,687,167 A | * | 11/1997 | Bertin et al. ................. 370/254 |
| 5,699,347 A | * | 12/1997 | Callon ......................... 370/238 |
| 5,732,072 A | * | 3/1998 | Thanner et al. ............. 370/255 |
| 5,740,171 A | | 4/1998 | Mazzola et al. ............ 370/392 |
| 5,764,636 A | | 6/1998 | Edsall ......................... 370/401 |
| 5,787,071 A | | 7/1998 | Basso et al. |
| 5,790,522 A | | 8/1998 | Fichou et al. |
| 5,790,808 A | | 8/1998 | Seaman ....................... 709/223 |
| 5,805,593 A | * | 9/1998 | Busche ........................ 370/396 |
| 5,815,492 A | | 9/1998 | Berthaud et al. |
| 5,825,772 A | * | 10/1998 | Dobbins et al. ............ 370/396 |
| 5,838,660 A | | 11/1998 | Crosin ........................ 370/216 |
| 5,838,663 A | * | 11/1998 | Elwalid et al. .............. 370/233 |
| 5,854,899 A | * | 12/1998 | Callon et al. ................ 709/238 |
| 5,878,232 A | | 3/1999 | Marimuthu ................. 709/249 |
| 5,898,691 A | | 4/1999 | Liu |
| 5,940,372 A | | 8/1999 | Bertin et al. |
| 5,991,817 A | | 11/1999 | Rowett et al. |
| 6,011,776 A | | 1/2000 | Berthaud et al. |
| 6,011,804 A | | 1/2000 | Bertin et al. |
| 6,023,733 A | | 2/2000 | Periasamy et al. |
| 6,032,194 A | | 2/2000 | Gai et al. |
| 6,038,212 A | | 3/2000 | Galand et al. |
| 6,049,533 A | | 4/2000 | Norman et al. |
| 6,058,117 A | | 5/2000 | Ennamorato et al. |
| 6,065,062 A | | 5/2000 | Periasamy et al. |
| 6,072,773 A | | 6/2000 | Fichou et al. |
| 6,075,769 A | | 6/2000 | Ghanwani et al. |
| 6,097,718 A | | 8/2000 | Bion |
| 6,111,877 A | | 8/2000 | Wilford et al. |
| 6,118,791 A | | 9/2000 | Fichou et al. |
| 6,128,656 A | | 10/2000 | Matchefts et al. |
| 6,151,324 A | * | 11/2000 | Belser et al. ................ 370/397 |
| 6,178,160 B1 | | 1/2001 | Bolton et al. |
| 6,212,183 B1 | | 4/2001 | Wilford |
| 6,243,667 B1 | | 6/2001 | Kerr et al. |
| 6,317,433 B1 | | 6/2001 | Casey et al. |
| 6,320,845 B1 | | 6/2001 | Davie |
| 6,256,309 B1 | | 7/2001 | Daley et al. |
| 6,260,071 B1 | | 7/2001 | Armistead et al. |
| 6,266,705 B1 | | 7/2001 | Ullum et al. |
| 6,327,251 B1 | | 7/2001 | Bion |

OTHER PUBLICATIONS

Lucent Technologies Inc.'s Initial Disclosure of Prior Art Under civil Local Rule 16–7, U.S. District Court for the Northern District of California, C.A. No. C98–20836JW (PVT) ENE, Nov. 18, 1998.

M. Seaman, High Availability Spanning Tree, Rev. 1.1, Oct. 26, 1998.

J. Hart, Extending the IEEE 802.1 MAC Bridge Standard to Remote Bridges, IEEE Network, Jan. 1998, vol. 2, No. 1, pp. 10–15.

B. Yener, et al., Fault–Tolerant Convergence Routing, Copyright 1994 IEEE.

R. Perlman, *Interconnections: Bridges and Routers*, Copyright 1992 by Addison–Wesley Publishing Company, Inc., pp. 54–64.

IEEE P802. 1d Draft Standard for Local Area Networks MAC (Media Access Control) Bridges: Technical and Editorial Corrections, Copyright 1997 IEEE, pp. 1–10, 85–122 and 151–158.

Configuring VTP, VLANs, VLAN Trunks and VMPS, Cisco Systems Inc., Published Jun. 9, 1998.

* cited by examiner

TOPOLOGY DATABASE
LINK CHARACTERISTICS

| CHARACTERISTIC | | LINK VALUES | | | |
|---|---|---|---|---|---|
| NAME | DESCRIPTION | A | B | ••• | N |
| C | TOTAL CAPACITY (bps) | $C_A$ | $C_B$ | ••• | $C_N$ |
| rf | RESERVABLE FRACTION (%) | $rf_A$ | $rf_B$ | ••• | $rf_N$ |
| $\hat{C}_R$ | TOTAL RESERVED BANDWIDTH (bps) | $\hat{C}_{R,A}$ | $\hat{C}_{R,B}$ | ••• | $\hat{C}_{R,N}$ |
| $M_{NR}$ | TOTAL BANDWIDTH USED BY NR TRAFFIC (bps) | $M_{NR,A}$ | $M_{NR,B}$ | ••• | $M_{NR,N}$ |
| mps | MAXIMUM PACKET SIZE (bytes) | $mps_A$ | $mps_B$ | ••• | $mps_N$ |

FIG. 6

ALTERNATE PATH COMPUTATION PROCEDURE

PATH RECOMPUTATION PROCEDURE

GARBAGE COLLECTION PROCEDURE

METHOD AND SYSTEM FOR MINIMIZING THE CONNECTION SET UP TIME IN HIGH SPEED PACKET SWITCHING NETWORKS

TECHNICAL FIELD

The present invention relates to high speed packet switching networks and more particularly to a method and process for minimizing the time to select an optimal routing path between an origin and a destination node in large communication networks.

BACKGROUND ART

High Speed Packet Switching Networks

Data transmission is now evolving with a specific focus on applications and by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above, there is strong requirement for supporting distributed computing applications across high speed networks that can carry local area network communications, voice, video and traffic among channel attached hosts, business, engineering workstations, terminals, and small to intermediate file servers. This vision of a high speed multi-protocol network is the driver for the emergence of fast packet switching networks architectures in which data, voice, and video information is digitally encoded, chopped into small packets and transmitted through a common set of nodes and links.

An efficient transport of mixed traffic streams on very high speed lines means for these new network architecture a set of requirements in term of performance and resource consumption which can be summarized as follows a very high throughput and a very short packet processing time, a very large flexibility to support a wide range of connectivity options, an efficient flow and congestion control.

Throughput and Processing Time

One of the key requirement of high speed packet switching networks is to reduce the end to end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the processing time and to take full advantage of the high speed/low error rate technologies, most of the transport and control functions provided by the new high bandwidth network architectures are performed on an end to end basis. The flow control and particularly the path selection and bandwidth management processes are managed by the access points of the network which reduces both the awareness and the function of the intermediate nodes.

Connectivity

In high speed networks, the nodes must provide a total connectivity. This includes attachment of the user's devices, regardless of vendor or protocol, and the ability to have the end user communicated with any other device. The network must support any type of traffic including data, voice, video, fax, graphic or image. Nodes must be able to take advantage of all common carrier facilities and to be adaptable to a plurality of protocols. All needed conversions must be automatic and transparent to the end user.

Congestion and Flow Control

Communication networks have at their disposal limited resources to ensure an efficient packets transmission. An efficient bandwidth management is essential to take full advantage of a high speed network. While transmission costs per byte continue to drop year after year, transmission costs are likely to continue to represent the major expense of operating future telecommunication networks as the demand for bandwidth increases. Thus considerable efforts have been spent on designing flow and congestion control processes, bandwidth reservation mechanisms, routing algorithms to manage the network bandwidth. An ideal network should be able to transmit an useful traffic directly proportional to the traffic offered to the network and this as far as the maximum transmission capacity is reached. Beyond this limit, the network should operate at its maximum capacity whatever the demand is.

Routing Modes

A general problem in the communication networks is to find a path between a source and a destination node. When the network is using datagrams, the path selection must be done individually for each packet. For virtual circuits, the path decision is done once only at the time of the connection (or session) establishment. In both cases, the choice of a routing algorithm is not easy because it must satisfy a large number of often conflicting requirements. However, the routing algorithm must allow to exploit the network in an optimal way, according to a criterion which can vary with the utilization type. In most of the cases, the network is realized in a way to minimize the packet transit time and to transfer the maximum number of packets. In other cases, the objective is to decrease the communication cost, or to develop a reliable network able to operate correctly either in case of catastrophic line, node failure or peaks of traffic.

Because of the variety of the constraints, there are a large number of different routing types like flooding routing, random or stochastic routing, deterministic routing. This last routing technique can be implemented according to particular modes such as fixed or adaptive routing, centralized or distributed routing, node by node or end to end routing, connection oriented or connectionless routing . . .

Adaptive Routing

Contrary to the Fixed Routing, where the routing rules are established once for all, the purpose of the Adaptive Routing is to satisfy at any time the optimization criteria. Tables are permanently updated according for example, the instantaneous state of the traffic on the links.

Distributed Routing

When the characteristics of the network fluctuate, it is possible to adapt the routing by assigning to one node the responsibility to update periodically the routing tables according to the traffic and the topology. The principal disadvantage of this method called Centralized Routing is to generate an important auxiliary traffic and to subordinate the good functioning of the network to only one node. On the other hand, the Centralized Routing can generate some problems at the time the tables are refreshed because said tables cannot be received at the same time by all the nodes.

The solution is to decentralize the tables at the level of each node. The Distributed Routing is a method in which neighboring nodes are exchanging messages concerning the traffic and the network conditions to update their own routing table.

End-to-End Routing

The Adaptive and Distributive Routing are both currently used together in most high speed networks.

In order to minimize the processing time and to take full advantage of the high speed/low error rate technologies, the transport and control functions provided by the high bandwidth networks are performed on an end to end basis. No hop by hop error recovery or retransmission is envisioned in high speed, high performance (low error) links and thus, there is no need for transit nodes to be aware of individual transport connections. The originating node is responsible for calculating the route that a packet must take through the network. The routing of the packets presents two aspects for which a wide range of implementing methods exists 1. Determining what the route for a given connection shall be,
2. Actually switching the packet within a switching node.

Connection-Oriented Routing

One distinguishing characteristic of a network is the presence or absence of a "connections" between end users. They are many ways of constructing connectionless or connection-oriented networks. In most of cases, packets using different routing modes can share the same data transmission facilities. Most of the high speed connections are established on a reserved path to guarantee the bandwidth and the quality of service requested by the user. The path across the network is computed in response to each connection request by the originating node. The computed path is based on the parameters characterizing the network connection's requirements and on link capacity and load information maintained within each network node. The originating node sends a reservation request to the end node. As the bandwidth request packet flows along the chosen path, each transit node determines whether it has enough capacity to accept the new connection. If the connection is accepted, the requested bandwidth is reserved. Changes are reflected in every node of the network by means of control messages. Once a connection is established, there is no need to place a destination address in the packet header every time a packet is sent. All that is needed is an identifier to specify which connection is to be used for this packet. Due to the low packet overhead, the connection oriented routing technique is particularly adapted to the transmission of very short packets (for example real-time voice connections). This technique requires that connection tables be set up and maintained dynamically in each node and this restricting makes datagram transport quite inefficient. The implementation of flow and congestion control in a connection oriented network is easier than in a connectionless one because network nodes can regulate the flow on individual connections. However, when a link or a node becomes inoperative (goes down) connections that were passing through the affected link or node are typically lost. A new connection must be established through a different route. This takes time and may disrupt the connection at the end user level. In comparison, connectionless networks typically reroute traffic automatically around link or node failures.

Path Selection

The role of the Path Selection process is to determine optimum paths for users across the network each time a connection is requested. This implies the allocation of network resources to users in order to guarantee their quality-of-service requirements while optimizing the overall throughput within the network. This function takes place entirely within the origin node. Various quality of service parameters may be specified by the users, some of them in order to satisfy realtime delivery constraints, others related to non real time data traffic transfer . . . The origin node computes a path to the destination node that is capable of carrying the new connection and providing the level of service required by the new connection. The Path Selection algorithm uses data describing the current traffic load in the entire network (nodes and links). Such data are stored in a topology database located in each node of the network. If no suitable path can be found to meet all requirements, the connection is rejected. Once, the origin node has found a suitable path, a set up message is generated which traverses the selected route, updating the resource allocations for each link visited by the set up message.

To meet high throughput, paths are selected and resources reserved once only at the time of the connection establishment. The Path Selection algorithm takes into account various constraints which comes both from the user (quality of service requirements, user's traffic characteristics) and from the current network topology and bandwidth allocation. In addition, the algorithm maximizes the network throughput by choosing a path with the least number of hops and which tends to achieve an even distribution of the traffic among the links. Once an appropriate path has been selected, the network connection establishment process takes place, and only then are the resources along the path reserved.

Connection Set Up Delay

Selecting a path and setting up a connection can take considerable processing overhead in network nodes and can generate a significant delay. For end nodes supporting multiple connections set up requests simultaneously, it is easy to have some sort of scheduling to avoid bottlenecks in the connection set up process. But nethertheless, the time for establishing a connection may be huge. For permanent connections the set up delay probably does not have very much meaning. However, for connections service in real-time, this is a very important parameter, especially since some connections terminate in equipment that runs time-outs.

This delay is also important from the point of view of path switching on failure or preemption. The rerouting of a lot of connections that were using a failing link or node may lead to a high number of simultaneous new path set up. The establishment in parallel of multiple new connections through alternate routes take time and usually disrupt the connections at the end user level. The non-disruptive path switch mechanism suppose that:

first, the physical network has enough residual capacity to accommodate the network connections affected by the failure event, and second, the path selection delay is minimized in order to preserve the connections at the end user level.

Large network are highly dynamic and ideally, the Path Selection algorithm should be executed each time a new connection is established to take into account the most recent image of the network. Practically, such a computation would demand an inordinate amount of processing time and is rarely justified during the life of a connection. It would be a waste of resource and money to use a very efficient processor for supporting a burst of path selections at set up time or when a failure occurs and then to keep it idle for hours. On the other hand, it is not useful to select a path based on a perfect image of the network when the status of links and nodes evolves continually. More the demand for bandwidth reservation is available, more the precision required for finding a path can be low.

In large high speed packet switching networks, the support of a high number of connection set up operations implies some requirements in term of performance and resource consumption which can be summarized as follows:

The origin node—or the node providing the route calculation for the origin node—must be able to decide where to route an incoming packet with a guaranteed quality of service (delay, loss, probability . . . ) in a very short portion of time. The computation must be sufficiently rapid to select an optimum path for each connection request.

In case of node or link failure, the origin node must be able to establish alternative connections without disrupting the traffic at the end user level.

The processing time in nodes must be minimized.

The network resources in the origin node, along the selected path and within the entire network must be optimized.

To optimize the node resources (processing capacity) while minimizing the connection set up delay, routes from the origin node to any destination node in the network can be pre-calculated independently of any connection request. This pre-calculation is executed in background when the connection set up process is idle. When a connection is requested, the path selection process first searches for a pre-calculated route. That is only when no pre-calculated path can be found, that the path selection algorithm is triggered. The path is computed and used for establishing the connection and routing the packets within the network. Said path is also stored in a list of pre-selected paths.

In order to optimize the network resources in term of overall throughput, the Path Selection process takes into account the current traffic conditions on the links. Consequently, the pre-calculated paths must be continuously updated according to the load variation on the network.

In case of link failure, it is important to reroute the traffic on alternative paths without any disruption of the end user connections. In general, the closer to the destination node the link is, the more the link carries connections towards this destination node. A failure on a link adjacent to an origin or destination node may entail a disruption of a lot of connections and may invalidate several pre selected routes. A solution is to pre-calculate more than one route for every destination node, each route using different links adjacent to the origin and destination nodes.

Therefore, a method must be provided for determining as fast as possible a route which fulfills the connection requirements in term of quality of service while optimizing the network resources.

SUMMARY OF THE INVENTION

The present invention is directed to packet switching communication networks comprising a plurality of nodes interconnected with transmission links. The object of the present invention is to minimize in access nodes the connection set up delay, and in particular the time to select an optimal path throughout the network between the access node and a destination node. Each node in the network comprises one or more communication adapters for receiving and transmitting data packets, a Route Controller for allocating, controlling, and managing network resources, a Topology Database for storing the network configuration and traffic characteristics, updated by means of network control messages, and a Routing Database, updated simultaneously with the Topology Database, for storing the selected or computed paths with their characteristics.

For each connection request, the claimed method and system involves the steps of:

for each connection request, selecting a pre-calculated path satisfying said connection request in the routing database, if no pre-calculated path satisfying the connection request is already stored in the routing database, calculating a path satisfying said connection request and storing said path within the routing database.

In absence of connection request, the method and system involves the further steps of:

re-calculating the paths stored in the routing database periodically or in response to pre-determined events such as traffic variations, network configuration changes . . .

calculating, for each pre-calculated path stored in the routing database, at least one alternate path with the same origin node and the same destination node.

calculating paths from the origin node to all possible destination nodes.

removing pre-calculated paths from the routing database after a predetermined period of time without being selected.

BRIEF DESCRIPTION OF THE DRAWINGS

FIG. 6 shows the link characteristics stored in the Topology Database.

DESCRIPTION OF THE PREFERRED EMBODIMENT

High Speed Communications

Figure 2:
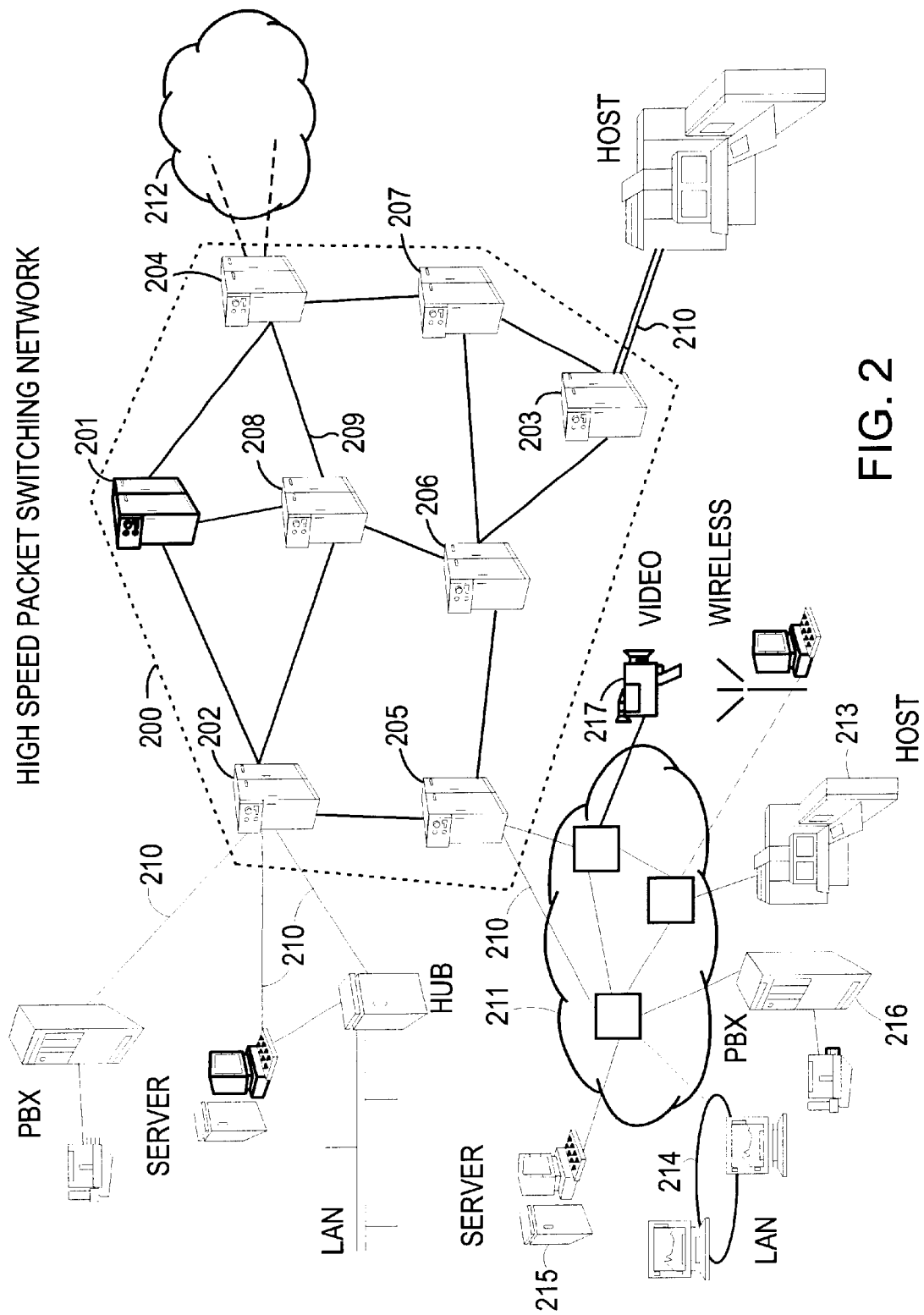
FIG. 2 shows a typical model of high speed packet switching network including the access and transit nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LAN (Local Area Networks 214), applications servers (215), PBX (Private Branch exchange 216) or video servers (217). These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer. To that end the transmission, routing and switching techniques within the nodes are optimized to process the flowing packets toward their final destination at the highest possible rate.

The present invention belongs essentially to the latter category and more particularly to the fast packet switching network architecture detailed in the following paragraphs.

High Performance Packet Switching Networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node (202) interfaces respectively a Private Branch exchange (PBX), an application server and a hub through three Ports and communicates through the network by means of the adjacent Transit Nodes (201), (205) and (208).

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes provide ancillary services such as:

the determination of routing paths for packets originated in the node, directory services like retrieving and updating information about network users and resources, the maintaining of a consistent view of the physical network topology, including link utilization information, and the reservation of resources at access points of the network.

According to the present invention, these ancillary services include:

the storage of routing paths within the node the updating of these paths.

Each Port is connected to a plurality of user processing equipments, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This header is made of Control, Routing and Redundancy Check Fields.

The Routing Fields contain all the information necessary to route the packet through the network (200) to the destination node to which it is addressed.

These fields can take several formats depending on the routing mode specified (connection oriented or connectionless routing mode . . . ).

The Control Fields include, among other things, an encoded identification of the protocol to be used in terpreting the Routing Fields.

The Redundancy Check Fields are used to check for errors in the header itself. If an error is detected, the packet is discarded.

Routing Points

Figure 3:
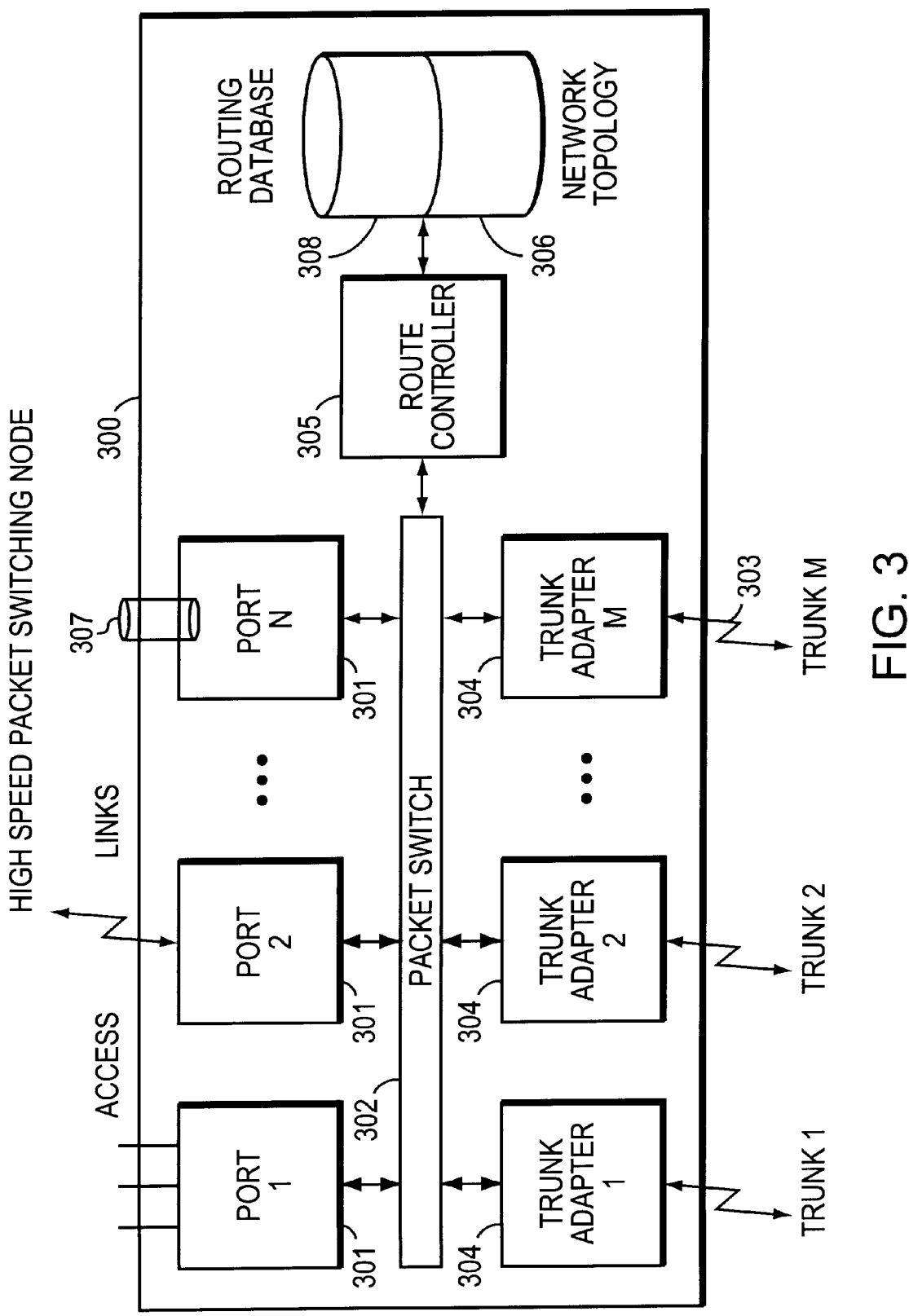
FIG. 3 describes a high speed Routing Point according to the presention invention.

FIG. 3 shows a general block diagram of a typical Routing Point (300) such as can be found in the network nodes (201 to 208) illustrated in FIG. 2. A Routing Point comprises a high speed packet Switch (302) onto which packets arriving at the Routing Point are entered. Such packets are received:

from other nodes over high speed transmission links (303) via Trunk Adapters (304).

from users via application adapters called Ports (301).

Using information in the packet header, the adapters (304, 301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum paths through the network (200) so as to satisfy a given set of quality of services specified by the user and to minimize the amount of network resources used to complete the communication path. Then, it builds the header of the packets generated in the Routing Point. The optimization criterion includes the number of intermediates nodes, the characteristics of the connection request, the capabilities and the utilisation of the links (Trunks) in the path, the number of intermediate nodes . . . According to the present invention, the optimum route is stored in a Routing Database (308) for further reuse.

All the information necessary for the routing, about the nodes and transmission links connected to the nodes, are contained in a Network Topology Database (306). Under steady state condition, every Routing Point has the same view of the network. The network topology information is updated when new links are activated, new nodes added to the network, when links or nodes are dropped or when link loads change significantly. Such information is exchanged by means of control messages with all other Route Controllers to provide the up-to-date topological information neeeded for path selection (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point is dictated by the information in the packet header. The fast packet switching network operates to enable a communication between any two end user applications without dedicating any transmission or node facilities to that communication path except for the duration of a single packet. In this way, the utilisation of the communication facilities of the packet network is optimized to carry significantly more traffic than would be possible with dedicated transmission links for each communication path.

Network Management

Network Control Functions

Figure 5:
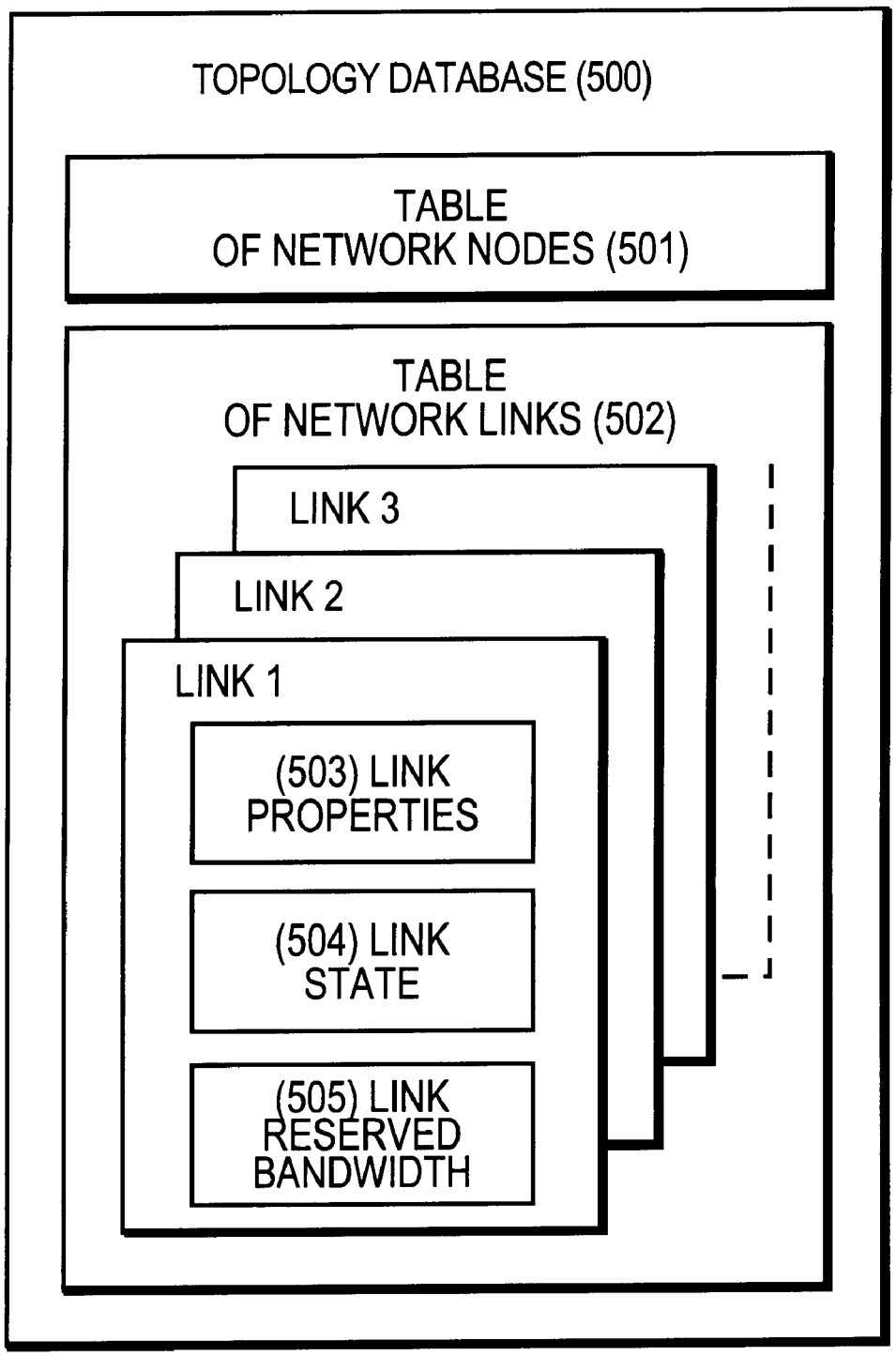
FIG. 5 describes the Topology Database structure.

The Network Control Functions are those that control, allocate, and manage the resources of the physical network. Each Routing Point has a set of the foregoing functions in the Route Controller (305) and uses it to facilitate the establishment and the maintenance of the connections between users applications. The Network Control Functions include in particular:

Directory Services
   for retrieving and maintaining information about network users and resources.
Bandwidth Management
   for processing the bandwidth reservation and maintenance messages, and
   for monitoring the current reservation levels on links.
Path Selection
   for choosing the best path for each new connection considering the connection requirements and the current link utilisation levels.
Control Spanning Tree
   for establishing and maintaining a routing tree among the network nodes,
   for using it to distribute control information (in parallel) including link utilisation, and
   for updating the Topology Database of the nodes with new network configurations or link/node failures.
Topology Update
   for distributing and maintaining, using the Spanning Tree, information about the logical and physical network (including link utilization information) in every node.
Congestion Control
   for enforcing the bandwidth reservation agreements between the network's users and the network which are established at the call set up time, and
   for estimating actual bandwidth and for adjusting reservation if necessary during the life of the connection.
Topology Database (TDB)
   The Topology Database contains information about nodes, links, their properties, and the bandwidth allocation. The topology information is replicated in each node of the network. An algorithm guarantees the correctness of each node's Topology Database when links and nodes are added or deleted or when their characteristics change. The database comprises:
   the physical topology of the network which includes static information like physical characteristics of nodes and links,
   the state of nodes and links, and
   the link utilisation which includes dynamic characteristics like current bandwidth (used and reserved), real time measurements . . .
   The general organisation of the Topology Database is shown in FIG. 5. To each resource in the network, nodes (501) or links (502), is associated an entry in the database. In particular, each link entry includes the following characteristics:
(503) the link physical properties:
   transmission medium and speed,
   routing mode supported,
   maximum packet size,
   link buffer capacity,
   propagation delay,
   bandwidth reservation supported...
(504) the link state:
   on-line (link can accept user connections),
   quiesce (link cannot accept additional user connections, but existing connections continue),
   off-line (link cannot accept user connections and existing connections are cancelled) . . .
(505) the link utilization:
   real time measurements,
   reserved bandwidth, . . .
   FIG. 6 shows in a table, some of the information stored in the Topology Database. Though all characteristics of the links are listed in each node, in the present application only a few will be described:
Total Capacity (bps) $C_{ij}$
   The topology Database contains, for each link, its Total Capacity. The value $C_{ij}$ represents the total bandwidth available on the link between nodes i and j.
Reservable Fraction (%) rf
   As might be expected, one of the critical characteristics of transmission links is the fraction of the link capacity effectively available. Links cannot be loaded up to a theoretical maximum load (bandwidth) for two reasons:
      first, to set aside bandwidth for network control functions, and
      secondly, to keep the loss probabilities and queuing delays low in the case of short term bandwidth violations by the different traffic sources.
   The reservable fraction of a link rf is the effective percentage of the Total Capacity $C_{ij}$ that can be reserved on the link between nodes i and j to maintain a reasonable quality of transmission. If $C_{ij}$ is the Total Capacity of the link, then $R_{ij}=rf \times C_{ij}$ is the Reservable Capacity of this link ($\hat{C}_{R,ij} \leq R_{ij} \leq C_{ij}$).
   Note: For most network architectures, no more than 85% of the total bandwidth of a link $C_{ij}$ can be explicitly reserved for user traffic (rf<0.85).
Total Reserved Equivalent Capacity (bps) $\hat{C}_{R,ij}$
   For a connection k on a link between nodes i and j, the simplest way to provide low/no packet loss would be to reserve the entire bandwidth requested by the user. However, for bursty user traffic, this approach can waste a significant amount of bandwidth accross the network. To save resources, the bandwidth amount actually reserved is equal to an "Equivalent Capacity" $\hat{C}_{K,ij}$ said Equivalent Capacity being a function of the source characteristics and of the network status. The bandwidth reservation falls somewhere between the average bandwidth required by the user and the maximum capacity of the connection.
   The value $$\hat{C}_{R,ij} = \hat{C}_{R,ij}^K = \sum_{k=1}^{K} \hat{c}_{k,ij} =$$

=sum of the reserved Equivalent Capacities represents the total bandwidth reserved on the link between nodes i and j by K connections already established. If the difference between this already link Equivalent Capacity $\hat{C}_{R,ij}$ and the Total Reservable Capacity of the $rf \times C_{ij}$ is less than the bandwidth requested by a new reserved connection then the link cannot be selected.
   However, the link may be selected for a non-reserved connection where no explicit bandwidth reservation is needed.
   Note: the Equivalent Capacity is calculated from values called "link metrics" representing the aggregation of all connections (possibly with varied characteristics) traversing a link. Link metrics are distributed to other nodes via a topology update broadcast.
Total Bandwidth used by NAon-Reserved Traffic (bps) $M_{NR,ij}$ The value $M_{NR,ij}$ represents the total load or bandwidth currently used by non-reserved traffic as measured on the link between nodes i and j.
Maximum Packet Size (bytes) $mps_{ij}$ $mps_{ij}$ is defined as the maximum packet size supported by the link between nodes i and j.

Total Bandwidth Used (bps) $\square_{T,ij}$ The Total Bandwidth Used $\square_{T,ij}$ on the link between node i and node j is computed by adding the total reserved bandwidth $\square_{T,ij}$ and the measured bandwidth $M_{NR,ij}$ used by non-reserved traffic.

Bandwidth Management

Users are requiring different quality-of-services. In order to provide the various service levels, different types of network connections are established. A connection is defined as a path in the network between the origin access node and the destination access node representing respectively the source user and the target user. Networks connections can be classified as reserved or non-reserved. Reserved network connections require bandwidth to be allocated in advance along the chosen path.

Most of the high speed connections are established on a reserved path to guarantee the quality of service and the bandwidth requested by the user. This path across the network is computed by the origin node using information in its Topology Database including current link utilizations. The origin node then sends a reservation request along the chosen path, and intermediate nodes (if allowing the reservation) then add this additionally reserved capacity to their total. These changes are reflected in topology broadcast updates sent by the intermediate nodes. Intermediate nodes need not to have an awareness of the status of each connection on their adjacent links. If an intermediate node does get too many packets, generally because of unanticipated burstiness, it simply discards them (the user can select a service that will recover from such discards).

Depending on the node type, the function of the Bandwidth Management is:

in the origin node,
   to identify the best possible route according to the network status and the connection parameters including the connection priority,
   to reserve at connection setup, the bandwidth required by the network connections and to maintain this bandwidth for the duration of the connection.
   to reject the connection if resources needed to satisfy the request are not available in the network.
in a transit node,
   to administer the bandwidth reservations on the links.

Connection Set Up

Figure 1:
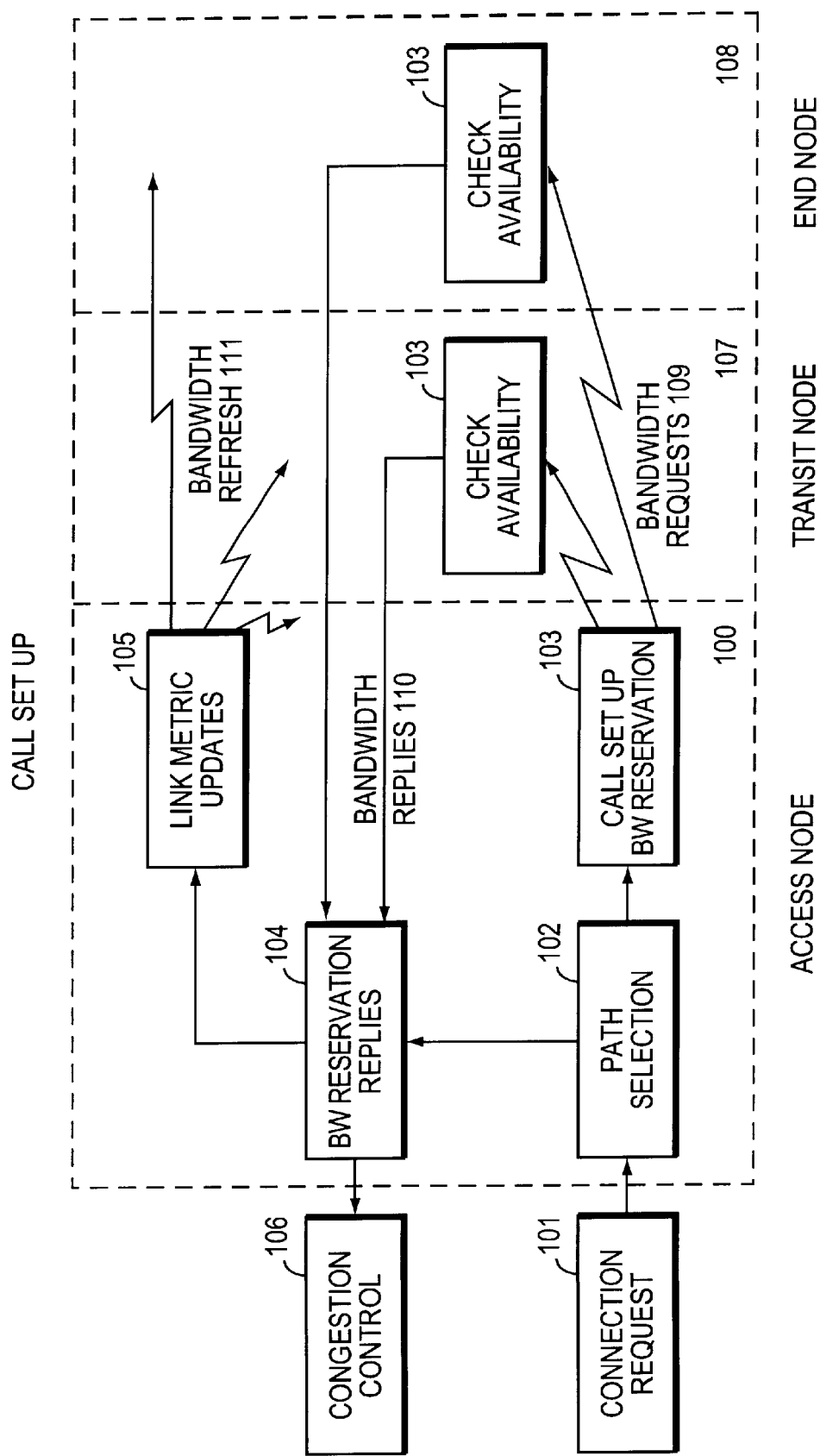
FIG. 1 describes the call set up process according to the present invention.

The connection set up and bandwidth reservation process, as shown in FIG. 1, comprises the following steps:
(101) a Connection Request is specified by the user via a set of parameters including origin and destination network address, and data flow characteristics (bit rate, burstiness).
(102) a Path Selection process determines a path and a set of connection requests, one for each link of the path, using parameters provided by the Topology Database.
(103) a Bandwidth Reservation process uses the connection requests to reserve bandwidth on each of the links of the path. This process involves exchange of information (109) between the origin (access) node (100), the transit nodes (107) on the path, and the destination node (108).
(104) Bandwidth Reservation replies from transit nodes and end node generate either a call acceptance or a call reject (110).
(105) a Link metric Update process updates, in case of call acceptance, the modified link metrics. This information (111) is sent through the Control Spanning Tree to the Topology Database of each node in the network by means of a broadcast algorithm.
(106) a Congestion Control Set Up adjusts, if the call is accepted, the network connection characteristics.

Path Selection

The purpose of the Path Selection process is to determine the best way to allocate network resources to connections both to guarantee that user quality of service requirements are satisfied and also to optimize the overall throughput of the network. The Path Selection process must supply to the requesting user a path over the network over which a point-to-point connection will be established, and some bandwidth will be reserved if needed. The Path Selection algorithm uses as input parameters on one hand the user requirements and on the other hand the status of the network links and nodes as maintained in the Topology Database.

Selection Criteria:

The Path Selection process takes place entirely within the node wherein the connection is requested. It makes use of the Topology Database and selects the "best path" based on each of the following criteria in order of importance:

Quality-of-Service

The connection's quality-of-service requirements are to be satisfied throughout the life of the connection. There are a large number of variables that determine the performance of a network. However, the quality-of-service can be defined as the set of measurable quantities that describe the user's perception of the service offered by the network. Some of the quality-of service parameters are listed below:
   connection set up delay,
   connection blocking probability,
   loss probability,
   error probability,
   end-to-end transit delay,
   end-to-end delay variation,
   . . .

Some of these quantities have an effect upon how paths are computed, for example the packet loss probability or the end-to-end transit delay: the sum of propagation delays along a computed path may not violate the end-to-end transit delay specifications.

Minimum Hop:

The path shall consist of as few links as feasible to support the connection's quality of service requirements, thus minimizing the amount of network resources as well as processing costs to support the connection. The path computation is based on the links utilization at the time the connection is requested.

Load Balancing

Among a minimum hop path, a path with "lightly loaded" links is preferred over a path with "more heavily loaded" links based on the network conditions at the time of path selection. The load of a link depend of the customer criteria: it can be an increasing function of the total reserved bandwidth of the link, proportional to the amount of traffic actually measured on the link, . . . When the path load (sum of the load of the links over the selected path) is the preponderant criterion of selection, the path of lesser load is chosen.

Satisfying the first requirement is the key factor in path selection and the other two functions are used to optimize traffic through the network.

Path Calculation: The Path Selection process collects all the input information and calculates first the Equivalent Capacity of the new network connection. Then potential paths through the network from the origin to the destination node(s) are calculated. The Topology Database is used to determine the suitability of links for the potential path. The algorithm constructs new potential paths, adding links and nodes on a hop-by-hop basis, checking at each stage that the user requirements are being met.

At each stage, as links are added into a potential path, the algorithm determines that the new link has enough bandwidth to meet the resource reservation requirements. The algorithm also checks, at each stage, that addition of the new link still allow the total path to meet the user quality-of-service requirements. The algorithm is different for the different traffic classes. For example the end-to-end delay variation (jitter) requirements is more important for the real-time graphic calculation than for non-real time.

Additional Requirements: If the Path Selection process finds a number of suitable potential paths for a new network connection, which all meet the quality of service requirements, then it will select the path with the minimum number of hops as the optimal paths. This is because the minimum-hop path will result in the least amount of reserved bandwidth in the network, and therefore preserve network resources and reduce cost.

If the Path Selection process detects a number of suitable minimum-hop paths for a new network connection, which all meet the quality-of-service requirements, then it will select a path with more "lightly loaded" links in preference with heavily loaded links. The link utilizations from the Topology Database are used in this calculation.

Routing Database Structure

Figure 4:
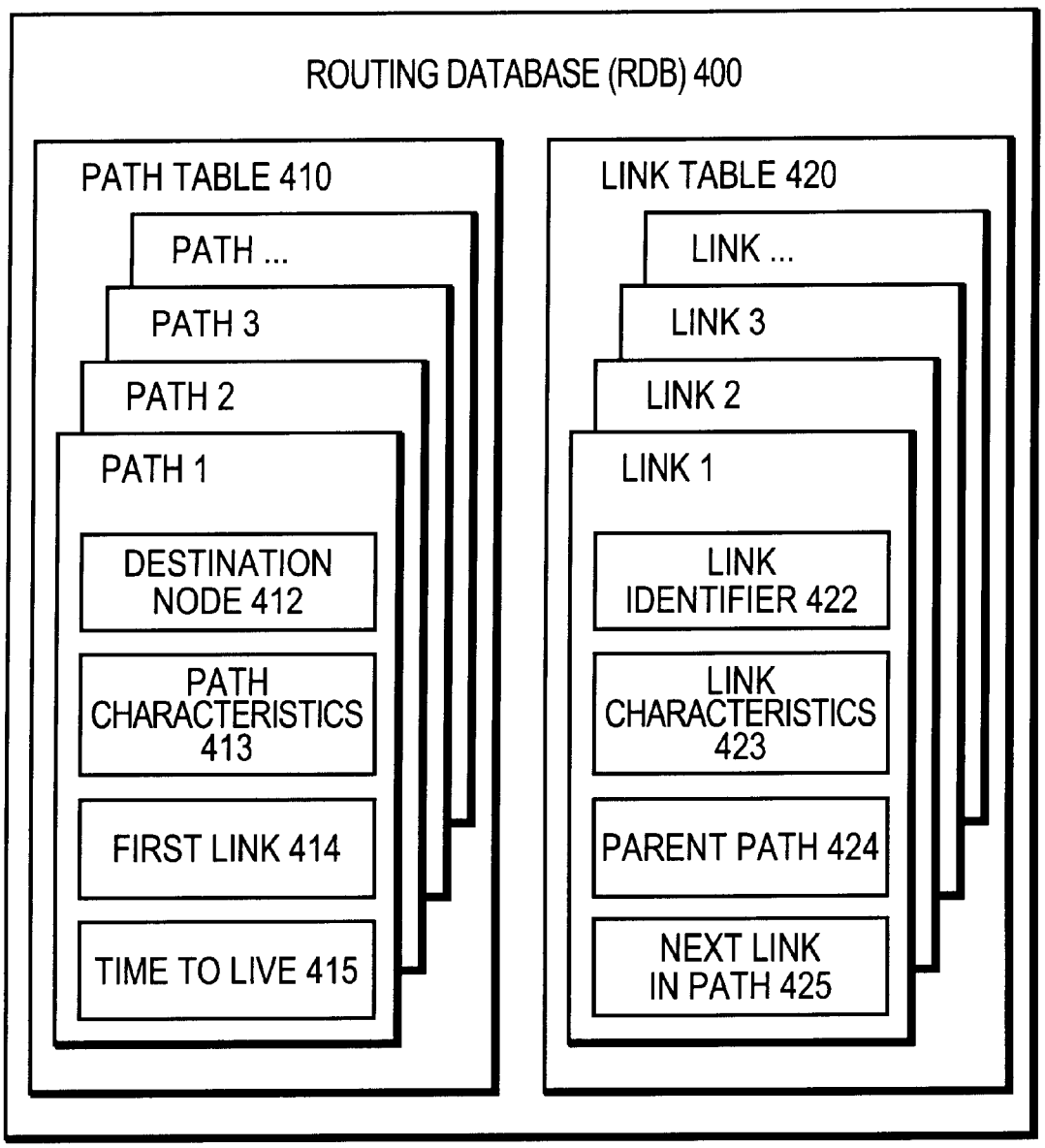
FIG. 4 shows the Routing Database structure according to the presention invention.

The general organization of the Routing Database (400) is shown in FIG. 4. The Routing Database is divided in two tables:

The Path Table (410) for recording the routing paths, and
The Link Table (420) for recording the links related to said routing paths stored in said path Table (410).

In a preferred embodiment, Path and Link Tables are implemented as hash tables with direct chaining in an overflow area as described in publication entitled "Algorithms+Data Structures =Programs" for Niklaus Wirth (pages 264 to 274, Prentice-Hall Inc).

Path Table

For the present application, only some of the parameters stored in the Path Table (410) will be described. Each entry of the Path Table represents a path between an origin node and a destination node in the network satisfying specific quality of service and traffic requirements:

Destination Node (412) Identification of the last node on the path.

Path Characteristics (413)

Maximum Packet Size: minimum of the maximum packet sizes supported by all links on the path calculated for all of the different delay priorities (real-time, non-real-time, non reserved delay priorities).

Maximum delay : sum of the transfer delay of all link on the path calculated for each of the different delay priorities (circuit emulation real-time, non-realtime, delay priorities).

Maximum delay variation (Jitter): sum of maximum delay variation of all links on the path calculated for all of the different delay priorities (real-time, non-real-time, delay priorities).

Loss probability: sum of loss probabilities of all links in the path calculated for all of the different delay priorities (real-time, non-real-time, best effort delay priorities). The loss probability may be estimated by the ratio (lost information)/(total information transferred). The lost information is information sent by the origin node that never arrives at the intended destination due to network conditions (congestion, traffic policing, errors . . . ).

Minimization criteria: depending on its type, a connection may pose its quality-of-service requirements and in particular its delay requirements in term of:

End-to-end delay without limit: among all possible paths, the path with the minimum end-to-end delay is selected.

Maximum absolute end-to-end delay: the path chosen guarantees that the end-to-end delay will be below the specified value throughout the life of the connection. This type of link delay constant is used mostly for real time traffic, which has a stringent end-to-end delay requirement.

Maximum end-to-end delay variation (maximum jitter): the amount by which the delay associated with a service varies is also known as "delay jitter". For some types of services a considerable delay may be acceptable provided that it is predictable, that is, the delay jitter is kept small. For other services (for example, voice services) both the delay and the delay jitter need to be kept small.

Maximum end-to-end delay with playout buffer; for application involving isochronous traffic (for example, voice), a playout buffer is required at the destination node to smooth out the effects of delay variation and to ensure that packets are sent to the user at regular intervals. The amount of playout delay is selected to equal the maximum end-to-end delay variation that should be cancelled (jitter). The playout delay contributes to the end-to-end delay.

Security level (encryption) support: many organizations are concerned that their internal communications may be intercepted by eavesdroppers. To minimize the likelihood that communications can be intercepted, there are number of measures that can be taken: for example, using communication links that are harder to intercept such as optical fibers, or using encryption devices. However such security measures may not be required for all services as their use may involved additional expense or inconvenience. Therefore, there is a requirement when establishing a service to specify the security requirements for the service. The specification of the security needs for a service are generally specified using a security level.

Hop count: number of links in the path. The path selection process calculates a path with as few links as possible that supports the quality-of-service requirements of each requested connection. However, it may be desirable to put an upper limit on the number of hops in the chosen path. What this means is that there is a certain maximum number of hop which the cost of using the path becomes unacceptably high. In a preferred embodiment, the path selection algorithms check the candidate paths in the increasing number of hops and stop when the imposed maximum number of hop is reached. If more than one minimum-hop path satisfying the quality-of-service requirements is found, the one with the "lightly loaded" links is preferred over a path with "more heavily loaded" links based on the network conditions at the time of path selection. In most of cases, this condition tends to maximize the overall throughput of the network.

Bandwidth reservation support: network connections are primarily classified, based on their network resource needs, into either:

Reserved network connections. Reserved network connections require the reservation of some network resources prior to successful establishment of the network connection. If the network resources required for a network connection cannot be allocated, establishment of the network connection will fail. Of particular interest are reserved network connections that reserve bandwidth as these types of network connections are capable of providing a quality-of-service.

Non-reserved network connections. The non-bandwidth-reserved traffic is delayable, has a low average bandwidth, may last a very short time and its burstiness characteristics may not be known. The lowest delay is assigned to non-reserved traffic and the network drops non-reserved packets when their buffer overflow at intermediate nodes. That is why the transfer delay and loss probability are not part of the quality-of-service guaranteed to non-reserved connections.

While the connectionless routing mode is quite efficient to route packets that does not require any reservation nor quality-of-service, connection oriented routing mode is well adapted to route packets when reservation and quality-of-service are expected and provided.

Real-time traffic support: Each type of network traffic has its own particular characteristics and therefore needs to be treated differently. The traffic types may be summarized as follows:
traffic that is delay-and loss-sensitive, for example interactive video.
traffic that is delay-sensitive but tolerant to moderate losses, for example voice.
traffic that is both delay-and loss tolerant, for example most current datagram services.
traffic that is delay-tolerant but loss-sensitive, for example most database updates.

In addition to packet loss and average delay, real-time applications (like voice) are sensitive to the variation in delay (jitter) of the packet stream between origin and destination. Meeting the delay loss and jitter requirements of different traffic (or applications) in an integrated network requires corresponding functions to be defined in the architecture so that, when multiplexed together, one type of traffic will not cause degradation to the service provided to another type.

Circuit emulation support: Circuit emulation is intended for constant-rate voice and video applications etc . . . It provides transport for serial bit streams between access link interfaces on nodes and is used to support services that are similar to the dedicated leased line style of services available from most telecommunication carriers. Circuit emulation requires:
a constant bit rate at origin and destination,
a timing relationship between origin and destination,
a connection between end users of the service.

ATM network connection support: Current high speed packet switching network architecture can support different logical link types. However the choice of link types for connections between nodes in a network depends on the services available from carriers, the link speed required . . .

Asynchronous Transfer Mode links (ATM) can be dedicated leased lines or ATM connections provided by an ATM bearer service. Data is transferred on ATM links in fixed-length (53 bytes) cells with a 5 bytes ATM header and a 48 bytes payload. ATM links are used when nodes are connected via a permanent virtual path connection provided by an ATM bearer service.

Variable-length packet links can be a variety of leased or switched link connections (like T1, T3, E1,) supporting transmission of variable-length packets.

Variable-length packet links should be used when the majority of traffic in the network is variable-length data because variable-length packet links require significantly less overhead when transmitting variable-length packet traffic (for example, Frame Relay).

In some architectures, nodes support any combination of ATM and variable-length packet links to adjacent nodes and user data might be transferred through the network over a sequence of ATM and variable-length packet links without restriction. This combination of links can be used to build a private ATM network, that is, provide an ATM bearer service to ATM attached devices.

Routing support: Data packets are routed and queued in the transit nodes according to the routing information contained in the header. Several routing modes can be used in high speed networks. In most of the cases, packets using different modes can share the same data transmission facilities.

Automatic Network Routing (ANR) is a particular implementation of the distributed routing for connectionless networks. The access node is responsible for calculating the route the packet must take through the network. Each packet includes in its routing field a list of the labels of the links through which the packet will pass as it moves across the network. ANR requires no connection set up activity in intermediate nodes and is suitable for true datagram services. Variable-length packets and optional features such as a copy function and reverse path accumulation are supported.

Label Swapping is used in connection oriented networks. Each packet sent on the link has a header which includes an arbitrary number identifying which logical connection that this packet belongs to. Label Swapping requires that the connection tables be set up and maintained dynamically in each node. In contrast with ATM, Label Swapping supports variable-length packets, optional features such as reverse path accumulation and a more sophisticated loss priority structure.

Asynchronous Transfer Mode (ATM) is similar to the Label Swapping transfer mode except some features, including the header structure, the support of fixed-size packets (48 bytes payload with a 5 bytes header), the use of a two-level virtual connection hierarchy (Virtual Channel Connection VCC and Virtual Path Connection VPC), . . .

Free Bandwidth: minimum of the available bandwidth of all links along the path. Free Bandwidth available on link $l_{ij}$ between nodes i and j: $C_{ij}\text{rf-}\mathit{U}_{R,ij}$ First link (414)

Identification of the first link on the path (for example the address of the first link in the Link Table).

Time-to-Live (415)

This parameter is used to rid the Routing Database of outdated information. The "Time-to-Live" counter of each path in the Routing Database is decremented once every day. When a counter reaches zero, the corresponding path is considered as outdated and is removed from the Routing Database. Each time a path is selected, its counter is reset to its maximal value. See FIG. 13 for further details concerning the Garbage Collection Procedure.

Link Table

For the present application, only some of the parameters stored in the Link Table (420) will be described. Each entry of the Link Table represents a link $l_{ij}$ between a node i and a node j.

Figure 7:
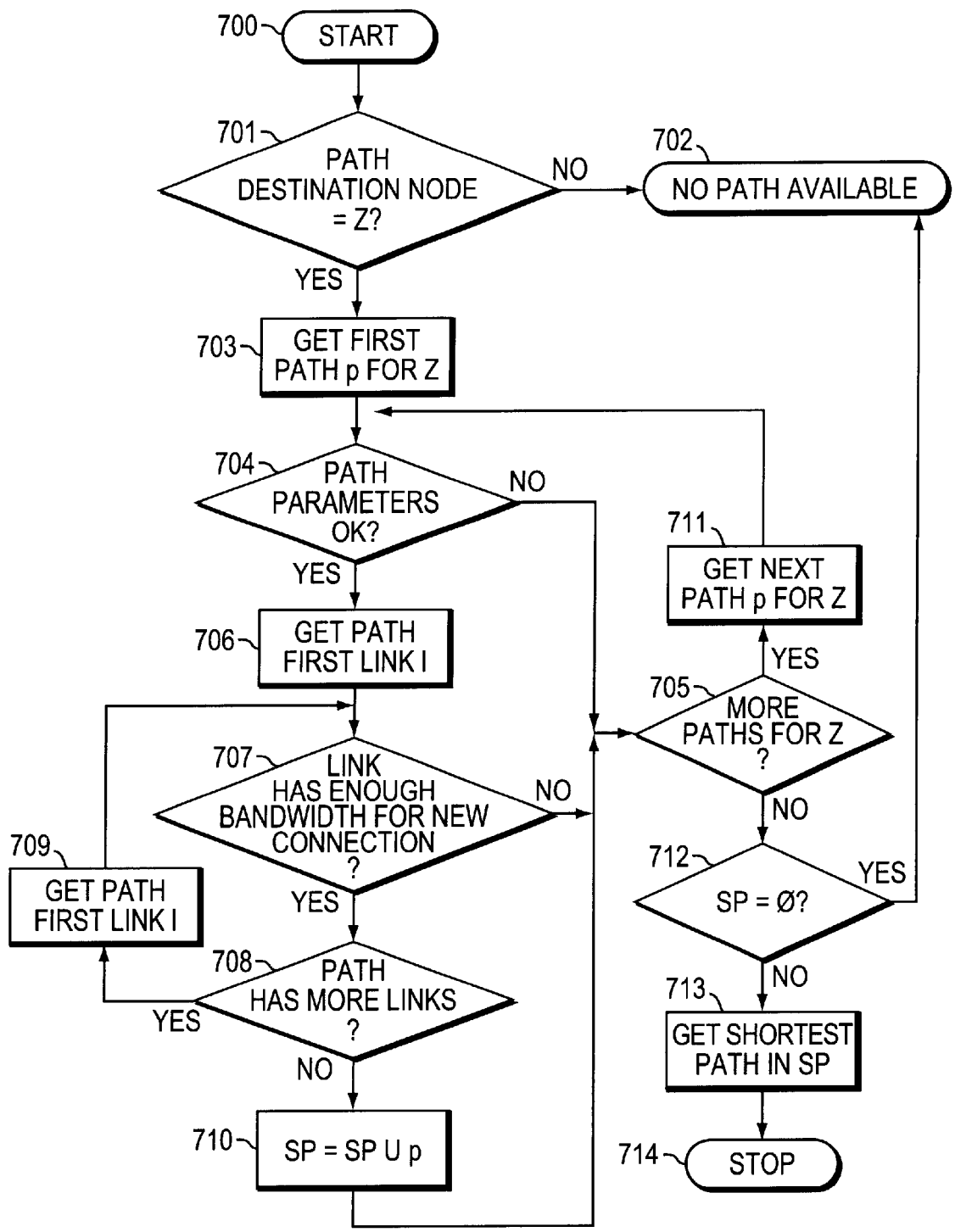
FIG. 7 shows a detailed flow chart of the Search Path Procedure according to the presention invention.
Figure 8:
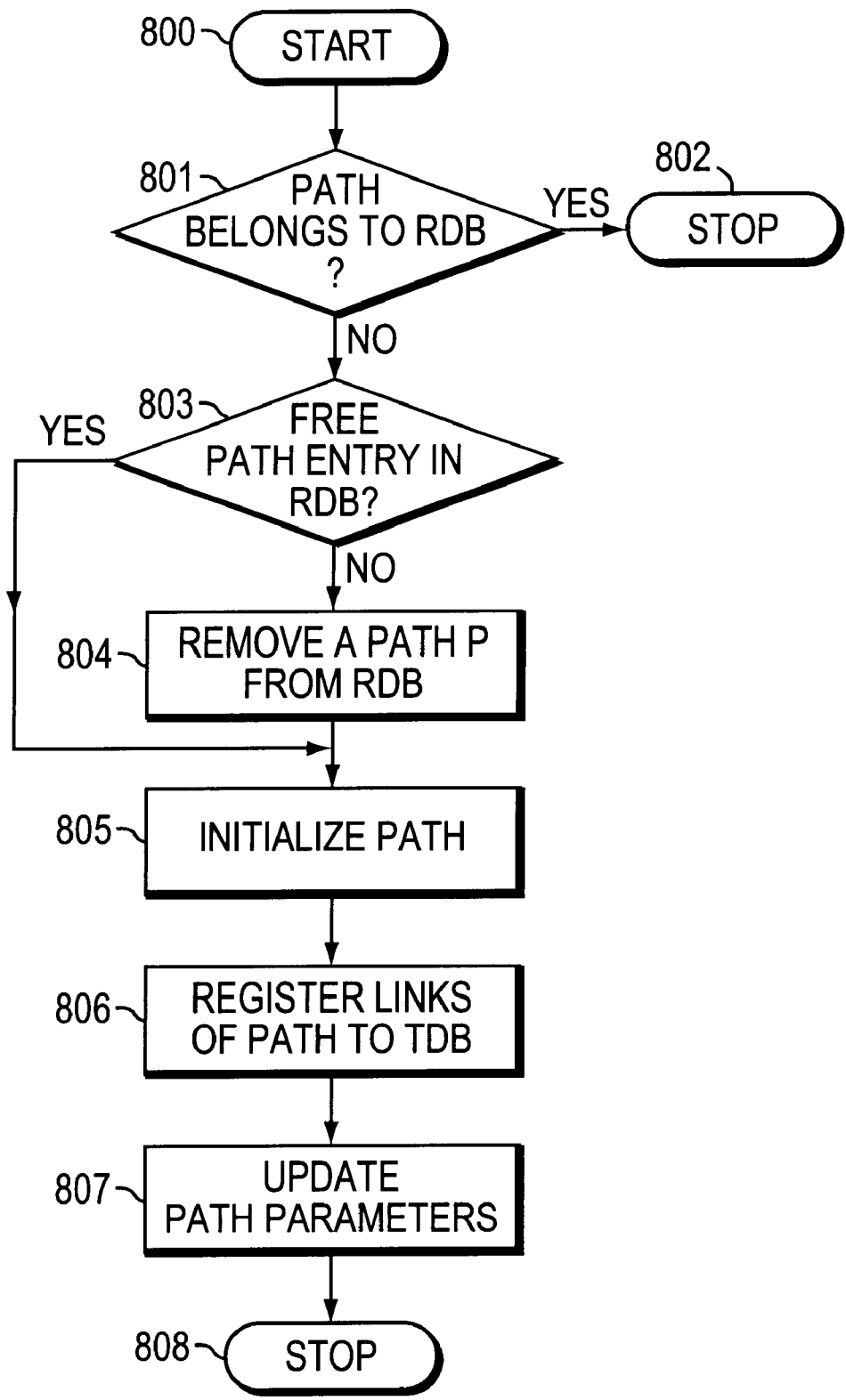
FIG. 8 shows a detailed flow chart of the Store Path Procedure according to the present invention.
Figure 13:
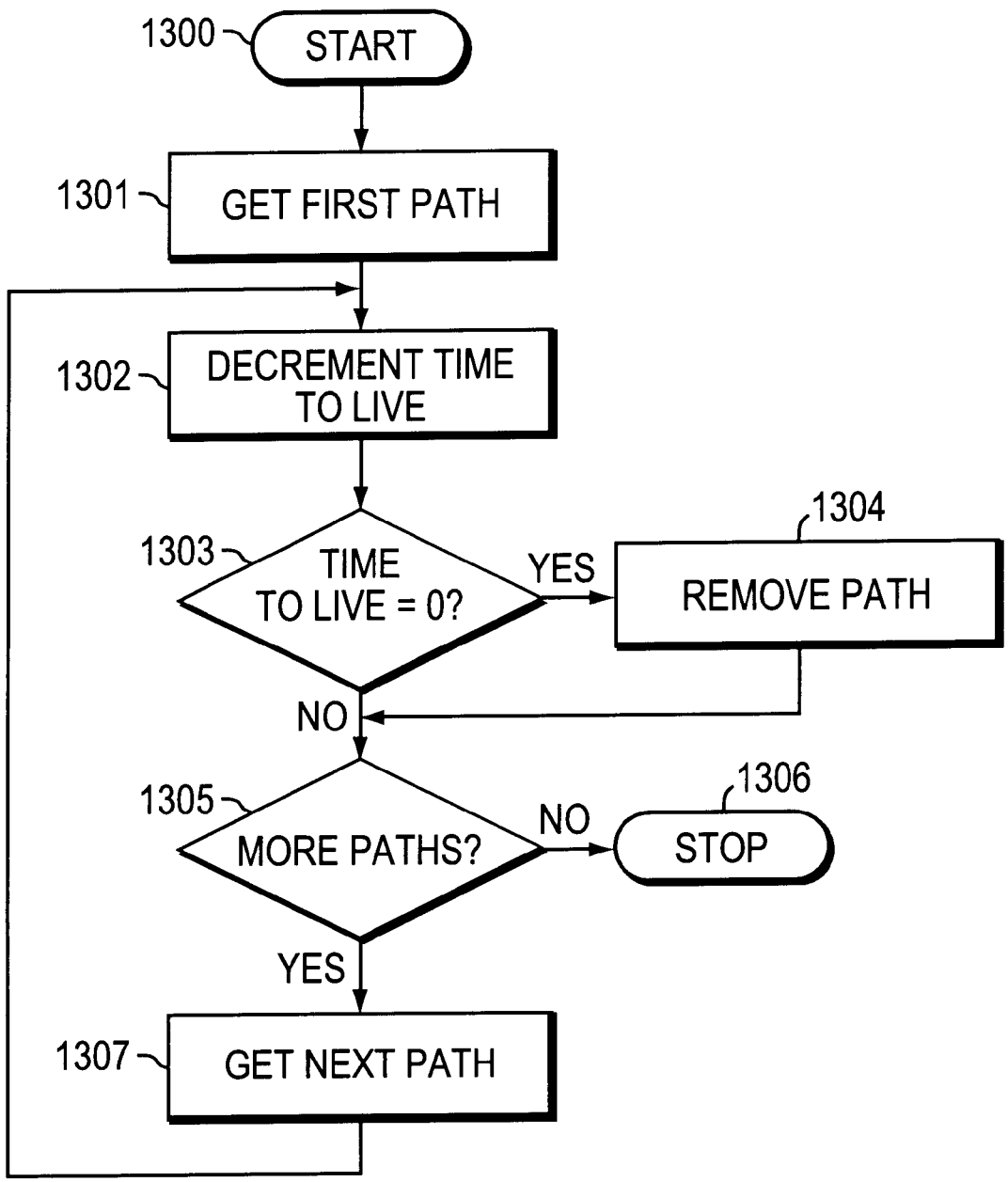
FIG. 13 shows a detailed flow chart of the Garbage Collection Procedure according to the present invention.

Link Identifier in the Topology Database (422):
The Link Identifier (for example the address of link in the TDB) is a means for having a direct access to the link characteristics (physical properties, state, utilization) stored in the Topology Database (502).
Link Characteristics (423):
Allocated Bandwidth $\Box_{R,ij}$ stored at different holding priority levels for real-time and non-real time delay priority (no allocated bandwidth in non reserved delay priority).
Note: The holding priority is the preemption priority of a connection once it has been established. On an other hand, the requesting priority defines a network connection's ability to preempt other connections. An existing connection defends itself against preemption using its holding priority.
Equivalent Capacity $\Box_{k,ij}$ of the requesting connection k computed with real-time and non real-time delay priority.
Parent Path (424)
Identification of the path associated with the link and stored in the Path Table (for example the address in the Path Table of the Parent Path).
Next Link in Path (425)
Identification of the next link along the path if any (for example the address in the Link Table of the next link on the path).
Routing Database Procedures
Garbage Collection
The Garbage Collection Procedure is used to remove from the Routing database the outdated information. In a preferred embodiment, this procedure is executed periodically (for example every day). FIG. 13 shows a general flow chart of the "Garbage Collection" Procedure.
(1300): start of the procedure.
(1301): the first path stored in the Routing Database is extracted.
(1302): the "time-to-live" counter associated with this path is decremented.
(1303) the value of the "time-to-live" counter is tested for determining whether or not the path is outdated.
(1304): if the value of "time-to-live" counter is equal to zero, the path is removed from the Routing Database and the procedure goes on with step (1305).
If the value of the "time-to-live" counter is not equal to zero, the procedure goes on with step (1305).
(1305): a test determines whether or not other paths are stored in the Routing Database.
If no other paths are stored, the procedure is complete and terminates in stop step (1306).
(1307): if other paths are stored, the next path stored in the Routing Database is extracted and the procedure goes on with step (1302).
Search Path
FIG. 7 shows a general flow chart of the "Search Path" Procedure. This procedure is called during the connection set up. When a connection request is received by the Path Selection, this procedure scans the Routing Database to determine whether or not there is at least one path satisfying this request. Let Z be the destination node and SP the list of selected paths.
(700): start of the procedure.
(701): a search in the Path Table determines whether or not a path for the requested destination node Z is already stored.
If no path is already stored in the Path Table, the path must be calculated. The Search Path Procedure is then complete and terminates in stop step (702). The Path Selection process will then determine a path which will be stored in the Routing Database according to the Store Path Procedure described in FIG. 8.
(703): if at least one path is already stored, the first path p stored is extracted from the Path Table.
(704): a test determines whether or not the characteristics (413) of the path p stored in the Path Table satisfy the request.
If the characteristics (413) of the path don't satisfy the request, the procedure goes on with step (705).
(706): if the characteristics of the path satisfy the request, the first link $l_{ij}$ of the path p is extracted from the Link table.
(707): a test determines whether or not the link between nodes i and j can support the new connection k in terms of:
Bandwidth requested by the new connection: $\Box_{k,ij}$
Allocated bandwidth on the link: $\Box_{R,ij}$
If the link cannot support the new connection k, the procedure goes on with step (705).
If the link can support the new connection k, the procedure goes on with step (708).
(708): a test determines whether or not the are more links in path p to scan.
(709): if the are more links to scan, the next link $l_{ij}$ in path p is extracted from Link table and the procedure goes on with step (707).
(710): if there are no more links to scan, path p satisfies the request and is stored in the list of selected paths SP. The procedure goes on with step (705).
(705): a test determines whether or not more paths are stored with the requested destination node Z.
(711): if more paths are stored, the next path p is extracted from the Path Table and the procedure goes on with step (704).
If no more paths are stored, the procedure goes on with step (712).
(712): a test determines whether or not the list of selected paths SP is empty.
If the list is empty, no path is available. The procedure is then complete and terminates in stop step (702). The Path Selection process will then determine a path which will be stored in the Routing Database according to the Store Path Procedure described in FIG. 8.
(713): if the list is not empty, the shortest path (with the smallest Length) in SP is selected. If several paths with the same length type exist in SP, the path having the largest free bandwidth is chosen in order to perform load balancing on the network. Then the process is complete and terminates in stop step (714).
Store Path
FIG. 8 shows a general flow chart of the "Store Path" procedure. This procedure is called at the end of each path computation processed by the Path Selection.
(800): start of the procedure.
(801): a test determines whether or not the calculated path is already stored in the Routing Database.
If the path is already stored, the procedure is complete and terminates in stop step (802).
If the path is not already stored, the procedure goes on with step (803).
(803): a test determines whether or not there is a free entry in the memory to store a new path in the Routing Database.

(804): if there is no free entry, the path with the lowest free bandwidth is removed from the Routing Database and the procedure goes on with step (805).
If there is a free entry, the procedure goes on with step (805).
(805): the related links are stored in the Link table (420). Link entries are chained together with the address of the next link on the path (425). The path is linked to said chain by means of the address of the first entry (414) of the chain in the Link table (420).
(806): the links associated with the path are registered in the Topology Database. The Topology Database inform The Routing Database each time:
a link on the path is no longer operational,
the bandwidth reservation on a link of the path is modified.
Upon receipt of the registration request, the Topology Database sends these informations until the Routing Database notifies it to stop. The registration is cancelled when a link is deleted from the Routing Database. This mechanism allows to maintain an up-to-date Routing database; refer to FIG. 12 for further details concerning the "Link Update" Procedure.
(807): the path characteristics (413) are updated with the information contained in the Topology Database. Then the procedure is complete and terminates in stop step (808).

Routing Database Update

The "Routing Database Update" process is a background task running periodically and preventively for preparing potential or alternate paths or for updating paths already stored in the Path Table (410). The process is executed in absence of connection request for not overloading the connection set up process. It comprises three procedures:
1. the "Alternate Path Computation",
2. the "Potential Path Computation", and
3. the "Path Recomputation".

When the Routing Database Update Process starts, the Alternate Path Computation Procedure is called first. When all paths stored in the Routing Database have been scanned for determining whether or not an alternate path must be computed for each of them, the Potential Path Computation Procedure is performed.

When all nodes stored in the Topology Database have been scanned for determining whether or not a potential path must be computed for each of them, the Path Recomputation Procedure is performed.

When all the paths stored in the Routing Database have been recomputed, the Alternate Path Computation Procedure is performed again. This is a never ending process which computes one path each time it is called.

Alternate Path Computation

If a path already stored in the Routing database is unique for a given destination node, an Alternate Path Computation is performed. This computation is done with the same path characteristics. However, the outgoing link from the origin node and the incoming link to the destination node are not selected to avoid using the same first and last links than the path already stored in the Routing Database. In case of a failure on one of those links, it will be then possible to reroute a lot of connections in a very short period of time. Alternate paths are prepared in advance and are ready to be used.

Figure 9:
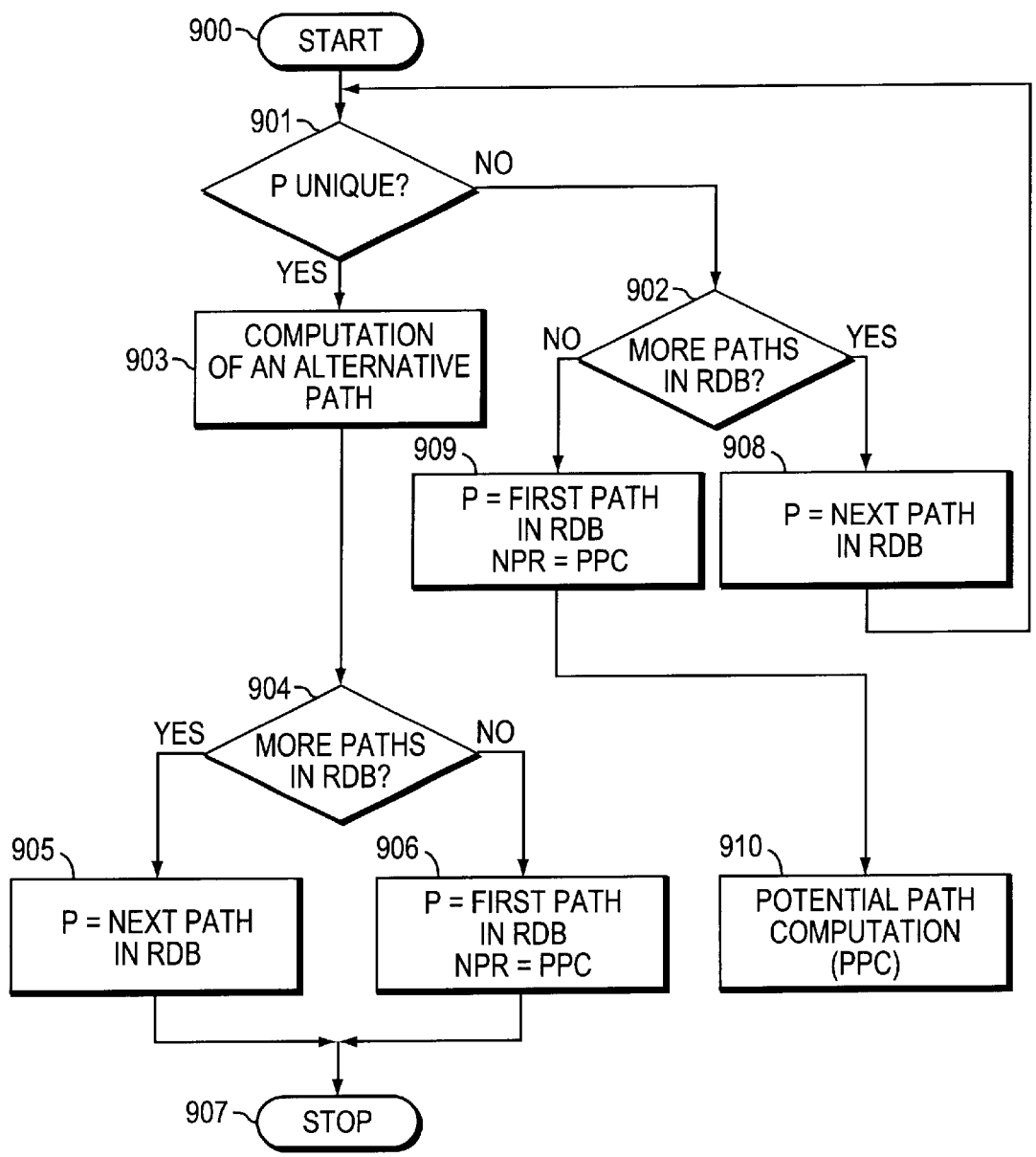
FIG. 9 shows a detailed flow chart of the Alternate Path Computation Procedure according to the present invention.

FIG. 9 shows a general flow chart of the Alternate Path Computation Procedure. let P be the current path to be scanned and NPR the next procedure to execute when the Routing Database Update process will be called again.
(900): start of the procedure.
(901): a test determines whether or not the path P is unique for its destination.
If the path is not unique, the procedure goes on with step (902).
(903): if the path is unique, an alternative path is computed and stored in the Routing Database using the Store Path Procedure detailed in FIG. 8. Then, the process goes on with step (904).
(904): a test determines whether or not there are more paths to scan in the Routine Database.
(905): if there are more paths to scan, P points to the next path stored in the Routing Database. The next path stored will be the current path to be scanned when the Routing Database update process will be called next time. Then the procedure is complete and terminates in stop step (907).
(906): if there is no more path to scan, P points to the first path stored in the Routing Database and NPR points to the Potential Path Computation Procedure. Then the process is complete and terminates in stop step (907).
(902): a test determines whether or not there are more paths to scan in the Routing Database.
(908): if there are more paths to scan, P points to the next path stored in the Routing Database and the procedure goes on with step (901).
(909): If there is no more path to scan, P points to the first path stored in the Routing Database and NPR points to the Potential path Computation Procedure. The procedure goes on with step (910).
(910): the Potential Path Computation Procedure described in FIG. 10 is performed.

Potential Path Computation

The Topology database is scanned for determining nodes which are not selected as destination node in any of the paths stored in the Routing Database. If such a node is found, a path is calculated with default parameters.

Figure 10:
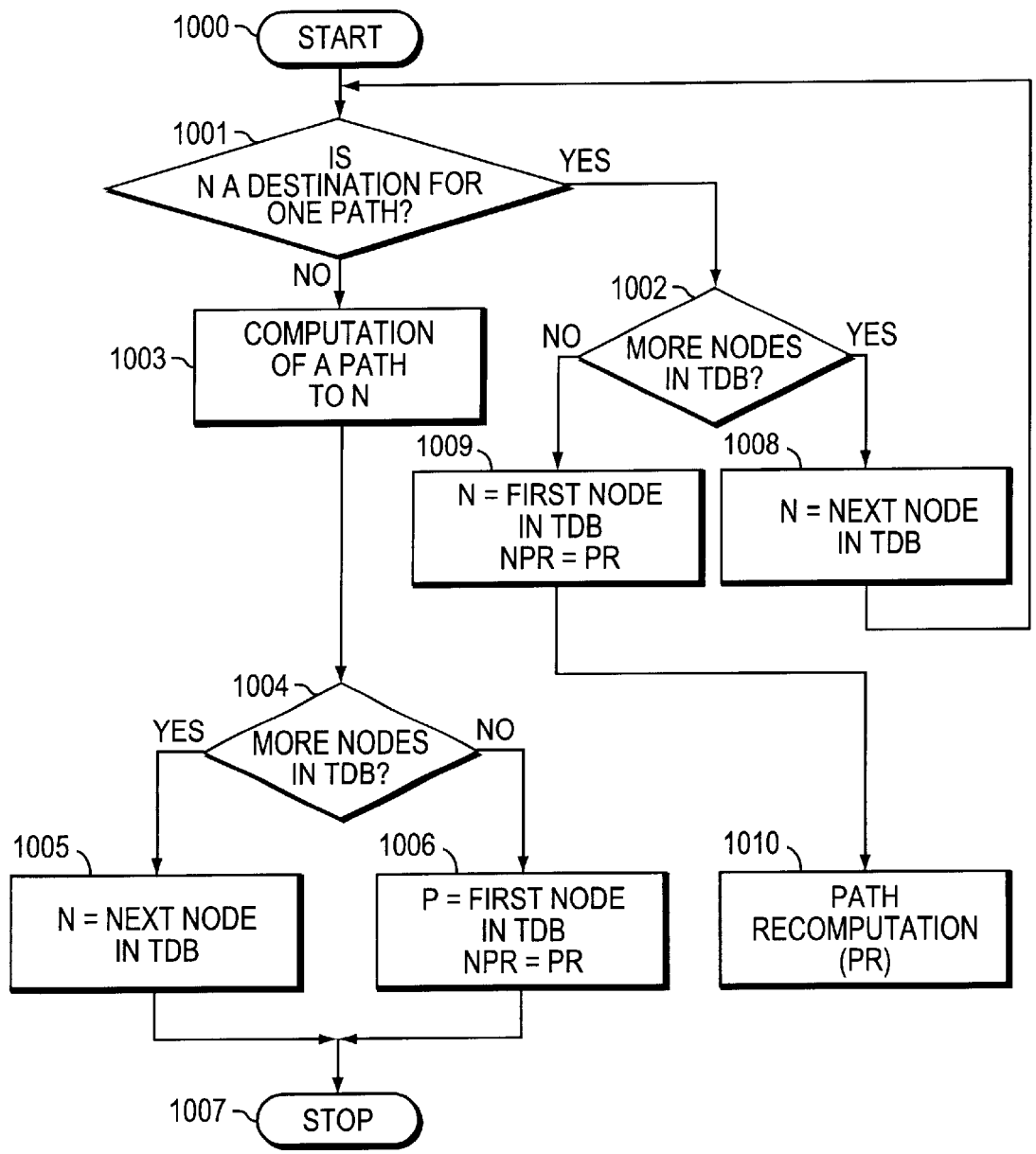
FIG. 10 shows a detailed flow chart of the Potential Path Computation Procedure according to the present invention.

FIG. 10 shows a general flow chart of the Potential Path Computation Procedure. Let N be the current node to be scanned and NPR the next procedure to execute when the Routing Database Update process will be called again.
(1000): start of the procedure.
(1001): a test determines whether or not the node N is a destination for, at least, one path stored in the routing Database.
If yes, the procedure goes on with step (1002).
(1003): if not, a potential path to N is computed The new path is stored in the Routing Database using the Store Path Procedure as described in FIG. 8. The procedure goes on which step (1004).
(1004): a test determines whether or not there are more nodes to scan in the Topology Database.
(1005): if there are more nodes to scan., N points to the next node stored in the Topology Database. The next node will be the current node to be scanned when the Routing Database update procedure will be called again. Then the process is complete and terminates in stop step (1007).
(1006): if there are no more nodes to scan, N points to the first node stored in the Topology Database and NPR to the Path recomputation Procedure. Then the process is complete and terminates in stop step (1007).
(1002): a test determines whether or not there are more nodes to scan in the Topology Database.
(1008): if there are more nodes to scan, N points to the next node stored in the Topology Database. Then, the procedure returns to step (1001).

Figure 11:
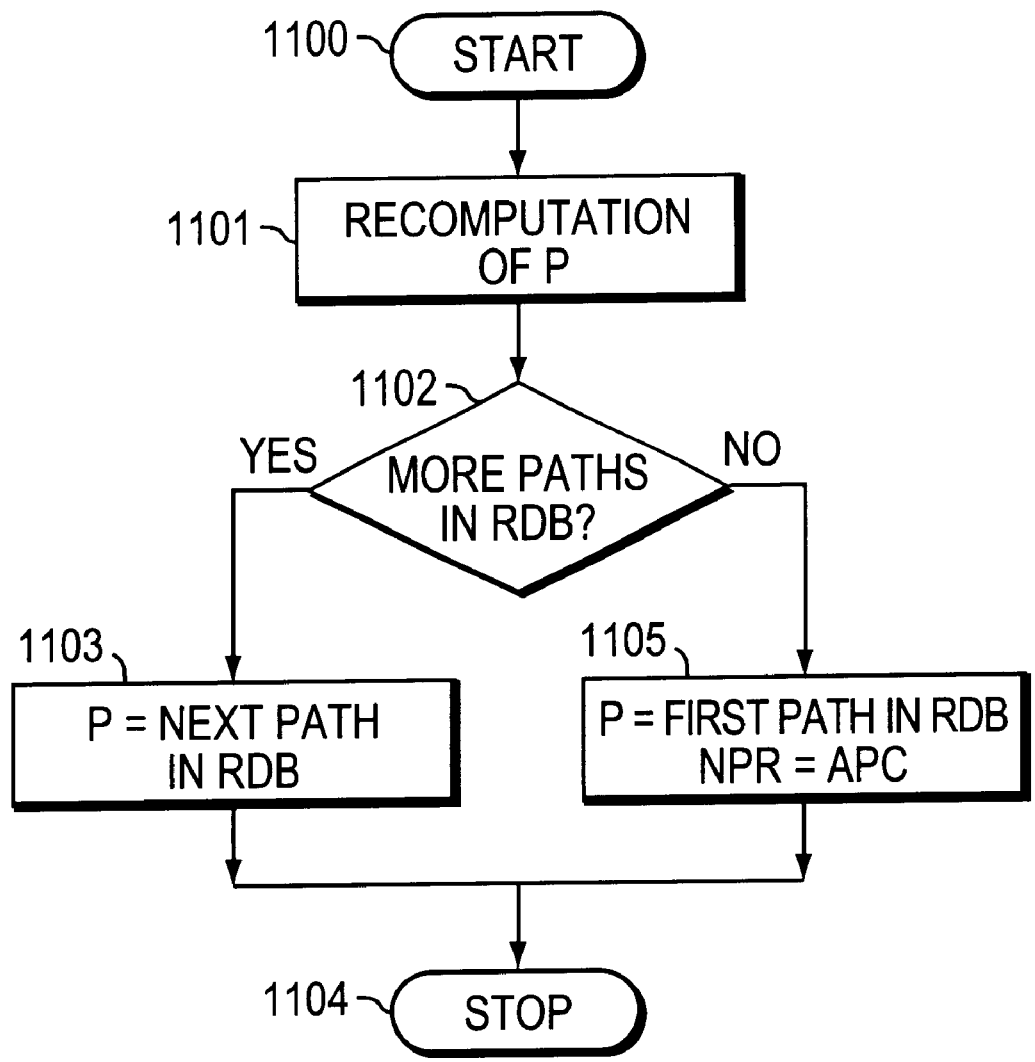
FIG. 11 shows a detailed flow chart of the Path Recomputation Procedure according to the present invention.

(1009): if there are no more nodes to scan, N points to the first node stored in the Topology Database and NPR to the Path Recomputation Procedure. The procedure goes on with step (1010).
(1010): the Path Recomputation Procedure as described in FIG. 11 is performed.

Path Recomputation

The paths stored in the Routing Database are recomputed with the path characteristics stored in the Path Table (410) (to determine whether or not they are yet the best ones). If another better path is found, it is added in the Routing Database. FIG. 11 shows a general flow chart of the Path Recomputation Procedure. Let P be the current path to be scanned and NPR the next procedure to perform when the Routing Database Update Process will be called again.

(1100): start of the procedure.
(1101): the path P is recomputed with stored characteristics and default parameters. The new path is stored in the Routing Database using the Store Path Procedure as described in FIG. 8.
(1102): a test determines whether or not there are more paths to scan in the Routing Database.
  (1103): if there are more paths to scan, P is initialized to the next path stored in the Routing Database. The next path will be current path to be scanned when the Routing Database update procedure will be called again. Then the process is complete and terminates in stop step (1104).
  (1105): if there is no more path to scan, P is initialized to the first path stored in the Routing database and NPR to the Alternate Path Computation Procedure. Then the procedure is complete and terminates in stop step (1104).

Link Update

Figure 12:
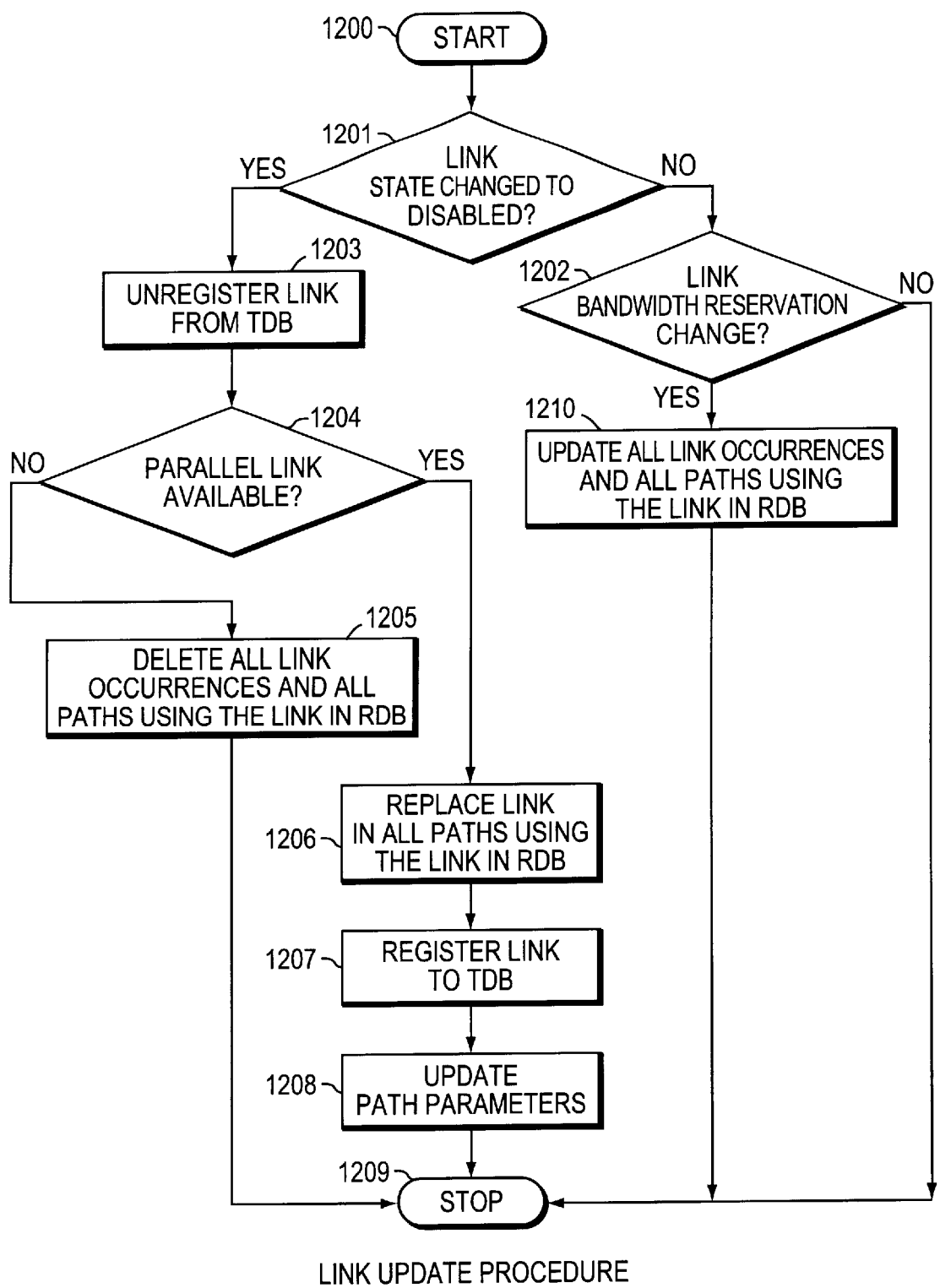
FIG. 12 shows a detailed flow chart of the Link Update Procedure according to the present invention.

FIG. 12 shows a general flow chart of the Link Update Procedure. This procedure is called by the Topology Database when a configuration update related to a link is stored in the Routing Database.

(1200): start of the procedure.
(1201): a test determines whether or not the configuration update is related to a change in the link state (failure on a link).
  If not, the procedure goes on with step (1202).
  (1203): if yes, the registration of that failing link is cancelled in the Topology Database.
(1204): a test determines whether or not a link parallel to the failing link (a link connecting the same nodes), is available.
  (1205): if no link is available, all link occurrences in the Link Table (420) and all paths using that link in the Path table (410) are deleted. The procedure is complete and terminates in stop step (1209).
  (1206): if a link is available, the failing link is replaced by the parallel one in all paths stored in the Path Table. The procedure goes on with step (1207).
(1207): the parallel link is registered in the Topology Database.
(1208): the paths are updated with the parallel link characteristics (423). Then the process is complete and terminates in stop step (1209).
(1202): a test determines whether or not the configuration update is related to a link bandwidth reservation change.
  If not, the process is complete and terminates in stop step (1209).
  (1210): if yes, all link occurrences—Allocated bandwidth (423)—and all paths using that link—Free Bandwidth (413)—are updated in the Routing Database. Then the process is complete and terminates in stop step (1209).

Conclusion

The path calculated at the time the connection is requested is recorded in a Routing Database and updated each time a modification occurs in the network. Furthermore, alternate paths for supporting non-disruptive path switch on failure or preemption, and new paths towards potential destination nodes can be calculated and stored when the connection set up process is idle. These last operations are executed in background with a low processing priority and in absence of connection request.

What is claimed is:

1. A method for establishing a connection between an origin node and a destination node in a packet switching communication network comprising a plurality of nodes interconnected by transmission links, said method comprising the steps of:
   storing in a routing database possible pre-calculated connection paths in the form of stored connection paths with their characteristics;
   responding to a connection request by determining whether said routing database contains a stored connection path in the routing data base satisfying requirements of the connection request;
   if a satisfactory stored connection path is found in the routing database, establishing a connection using the stored satisfactory connection path;
   if a satisfactory stored connection path is not found in the routing database, calculating a new connection path, establishing a connection using the new connection path and storing the new connection path in the routing database;
   for each connection path stored in the routing database, calculating at least one alternative connection path having transmission links and storing said alternative path in the routing database for possible future use; and
   periodically recalculating pre-calculated connection paths stored in the routing database.

2. A method as set forth in claim 1 wherein at least one of the transmission links on the alternative connection path is not included in the associated stored path, wherein each node includes an adapter for receiving and transmitting data packets.

3. A method as set forth in claim 1 where the alternative path is created from a set of links excluding the links in the associated stored connecting path adjacent the origin node and the destination node.

4. A method as set forth in any one of claims 1 through 3 further including the steps of:
   maintaining a topology database for storing network configuration and traffic characteristics;
   maintaining a record of when each path stored in the routing database was last used; and
   removing a path from the routing database in response to one of (i) when the maintained record shows that the path has not been used for at least a predetermined period of time, and (ii) when the network configuration and traffic configurations change.

5. A method as set forth in claim 3 further including a step of responding to a failure of a path used to establish a connection by retrieving the alternative path associated with the failed path from the routing database and re-establishing the connection using the retrieved alternative path.

6. For use in a node in a packet switching communication network having a plurality of nodes interconnected by transmission links, each node having an adapter for receiving and transmitting data packets, a connection setup system for establishing a connection between an origin node and a destination node, said connection setup system comprising:

a routing database for storing previously established paths between different ones of said nodes including characteristics of the previously established connection paths;

a path selection subsystem responsive to a connection request for determining whether said routing database contains a previously established stored connection path which is suited to cater requirements of the connection request, said path selection subsystem being responsive to a determination that a suitable path exists in said routing database to establish the requested connection using the previously established connection path, said path selection subsystem being responsive to a determination that no suitable path exists in said routing database to calculate a new connection path, minimizing connection setup delay and suited to the connection requirements, to establish the requested connection using the new path and to store the new path in the routing database to create a stored connection path, said path selection subsystem also being responsive to the existence of a stored connection path to calculate and store at least one alternative connection path associated with each stored connection path in the routing database; and a path recomputation subsystem for periodically recalculating stored connection paths stored in the routing database.

7. A connection setup subsystem as set forth in claim 6 wherein the path selection subsystem further includes link selection logic for establishing the alternative path using a set of links excluding one or more of the links making up the associated stored path.

8. A connection setup subsystem as set forth in claim 7 wherein the set of links used for establishing the alternative path excludes the links in the associated stored path adjacent the origin node and the destination node.

9. A system for a packet switching communication network having a plurality of nodes interconnected by transmission links, said system including a connection setup system for establishing a connection between an origin node and a destination node, comprising:

a routing database for storing previously established paths between different ones of said nodes;

a path selection subsystem responsive to a connection request for determining whether said routing database contains a previously established stored path satisfying the requirements of the connection request, said path selection subsystem being responsive to a determination that a suitable path exists in said routing database to establish the requested connection using the previously established path, said path selection subsystem being responsive to a determination that no suitable path exists in said routing database to calculate a new path minimizing connection setup delay and satisfying the connection requirements, to establish the requested connection using the new path and to store the new path in the routing database, said path selection subsystem also being responsive to the existence of a stored path to calculate and store an alternative path associated with each stored path in the routing database; and periodically recalculating the paths stored in the routing database.

10. A system as set forth in claim 9 wherein the path selection subsystem of said connection setup system further includes link selection logic for establishing the alternative path using a set of links excluding one or more of the links making up the associated stored path.

11. A system as set forth in claim 10 wherein the set of links used for establishing the alternative path excludes the links in the associated stored path adjacent the origin node and the destination node.

12. A method of determining an optimal path between an origin node and a destination node in a packet switching communication network comprising a plurality of nodes interconnected with transmission links, said method involving the steps of:

for each connection request, selecting a pre-calculated path satisfying said connection request in the routing database;

if no pre-calculated path satisfying the connection request is already stored in the routing database, calculating a path satisfying said connection request and storing said path within the routing database;

recalculating the paths stored in the routing database periodically; and recalculating the paths stored in the routing database in response to at least one pre-determined event in the network.

13. The method according to claim 12 wherein said at least one pre-determined event in the network is selected from a group consisting of routing requests, traffic variations, and network configuration changes.

14. The method according to claim 12 further comprising the step of calculating, for each pre-calculated path stored in the routing database, at least one alternate path with the same origin node and the same destination node.

15. The method according to claim 13 further comprising the step of calculating, for each pre-calculated path stored in the routing database, at least one alternate path with the same origin node and the same destination node.

16. The method according to claim 13 wherein a pre-calculated path is removed from the routing database after a predetermined period of time without being selected.

17. The method according to claim 13 wherein the steps of:

re-calculating the paths stored in the routing database in response to at least one pre-determined event in the network;

calculating, for each pre-calculated path stored in the routing database, at least one alternate path with the same origin and destination nodes;

calculating paths between the origin node and all possible destination nodes; and removing pre-calculated paths, are executed in the absence of said connection request.

18. The method according to claim 12 wherein a pre-calculated path is removed from the routing database after a predetermined period of time without being selected.

19. The method according to claim 12 wherein the steps of:

re-calculating the paths stored in the routing database in response to at least one pre-determined event in the network;

calculating, for each pre-calculated path stored in the routing database, at least one alternate path with the same origin and destination nodes;

calculating paths between the origin node and all possible destination nodes; and removing pre-calculated paths, are executed in absence of said connection request.

20. A node for carrying out the method according to claim 1 or claim 5 or claim 12.

21. A packet switching communication network comprising at least one node according to claim 20.

22. A computer-readable medium comprising: instructions and data written thereon, said instructions and data containing information for execution in a node for the practice of the method of claim 1 or claim 5 or claim 12.

23. Electromagnetic signals travelling over a computer network comprising: said electromagnetic signals carrying information for execution in a node for the practice of the method of claim 1 or claim 5 or claim 12.

* * * * *